United States Patent Office 2,844,585
Patented July 22, 1958

2,844,585

QUATERNARY AMMONIUM ALKYLAMINO-BENZOQUINONES

Chester J. Cavallito, Decatur, Ill., assignor to Sterling Drug Inc., New York, N. Y., a corporation of Delaware No Drawing. Application December 21, 1955
Serial No. 554,396

15 Claims. (Cl. 260—294.7)

This invention relates to quaternary ammonium salts of (tertiary amino)alkylamino-p-benzoquinones, and to processes for their production.

This application is a continuation-in-part of my copending application Serial No. 119,760, filed October 5, 1949, now abandoned.

I have discovered that compounds having valuable properties as highly active curarimimetic agents can be obtained by quaternizing (tertiary amino)alkylamino-p-quinones obtained from the interaction of p-benzoquinones with (tertiary amino)alkylamines.

My invention comprises: interacting a p-benzoquinone with one or two molecular equivalents of a primary or secondary N-[(tertiary amino)alkyl]amine under conditions of mild oxidation to yield, respectively, a 2-mono- or a 2,5-bis-[N-(tertiary amino)alkylamino]-p-benzoquinone; and converting the reaction product thus obtained to a quaternary ammonium salt thereof. In those instances where the p-benzoquinone is a tetrahalo-p-benzoquinone, the conditions of mild oxidation are unnecessary for the reaction with the alkylenediamine.

Broadly speaking, the new quaternary ammonium compounds provided by my invention have the general formulas

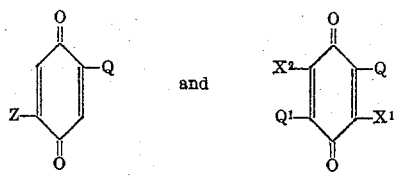

where Q and Q¹ are members of the group of iminoalkyl-(quaternary ammonium) radicals having the formula

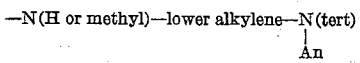

—N(H or methyl)—lower alkylene—N(tert)
|
An in which the lower alkylene bridge interposes 2–5 carbon atoms between the two nitrogen atoms connected by the bridge, N(tert) is a tertiary amine radical; Z is a member of the group consisting of hydrogen, lower alkylamino radicals, and di(lower alkyl)amino radicals; $X^1$ and $X^2$ are hydrogen or a middle halogen, i. e. chlorine or bromine; and An is a non-toxic anion. The iminoalkyl (quaternary ammonium) radicals and Q and Q¹ can be the same or different, as desired. Thus, all of my new quaternary compounds contain the parent structure which can be represented by

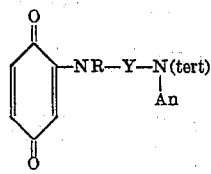

where R is hydrogen or methyl and Y is a lower alkylene bridge, or can be considered as derived therefrom by appropriate introduction of the above specified substituents in one or more of the 3, 5, and 6 positions of the parent structure, such substituents including particularly a second iminoalkyl (quaternary ammonium) radical in the 5-position identical with the substituent in the 2-position.

Represented ionically, these quaternary ammonium compounds have the structures

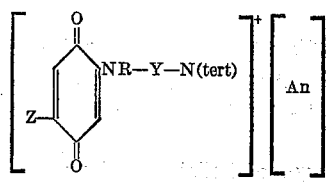

and

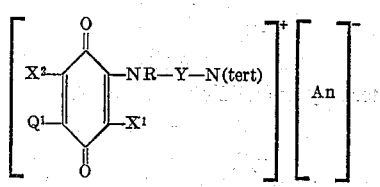

The quaternary ammonium grouping, [—N(tert)]+, makes its chief contribution to the physiological activity of my new compounds by virtue of the electrostatic field set up at the site of the quaternary nitrogen. Since this contribution is inherent in the quaternary ammonium grouping, the structure of the tertiary amine radical N(tert) can be varied very widely. Thus, this radical can be either cyclic or acyclic in structure and the groups attached to the nitrogen can be chosen from a great number of hydrocarbon or substituted hydrocarbon radicals. For practical reasons, however, I prefer to limit the scope of the radical N(tert) to those cyclic and acylic tertiary amine radicals containing not more than 20 carbon atoms. Moreover, from this restricted group of radicals, I prefer to exclude aromatic amine radicals which have an aryl radical attached directly to the amino nitrogen atom, since the low basicity of the arylamines leads to preparative difficulties and resultant lowered yields of products.

The iminoalkyl-(quaternary ammonium) radicals Q and Q¹ can be represented in a preferred scope by the structural formulations

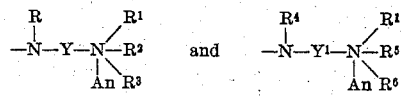

respectively, where $R^1$ is an aliphatic or aralkyl radical; $R^2$, $R^3$, $R^5$, and $R^6$, when taken separately, represent monovalent organic radicals other than aryl radicals and preferably containing 1–10 atoms each, or $R^2$ and $R^3$ or $R^5$ and $R^6$ taken together with the quaternary nitrogen atom form a 5–6 membered saturated heterocyclic ring which may additionally contain oxygen oxygen or sulfur; R and $R^4$ are hydrogen or methyl; and Y and $Y^1$ are lower alkylene bridges interposing 2–5 carbon atoms between the two nitrogen atoms connected by each bridge.

The aliphatic or aralkyl radicals represented by $R^1$ are, for example, alkyl radicals, alkenyl radicals, and benzyl radicals. The preferred radicals of this type are lower alkyl and lower alkenyl radicals containing 1–7 carbon atoms, such as methyl, ethyl, n-butyl, n-heptyl, allyl, methallyl, etc. and (monocyclic aryl)methyl radicals, i. e. benzyl radicals, containing 7–10 carbon atoms, and which may carry inert substituents on the ring such as lower alkyl, lower alkoxy, or halogen, e. g. benzyl, 2,4,6-trimethoxybenzyl, p - methoxybenzyl, p - chlorobenzyl, methylbenzyl, etc.

The monovalent radicals represented by $R^2$, $R^3$, $R^5$ and $R^6$ include lower alkyl radicals such as methyl, ethyl, n-propyl, isopropyl, n-butyl, isohexyl, etc. and lower alkenyl radicals such as allyl, methallyl, etc.

When $R^2$ and $R^3$ or $R^5$ and $R^6$ are taken together with the nitrogen atom to form a saturated 5–6 membered heterocyclic ring, the quaternary ammonium radical

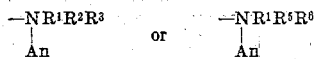

includes cyclic quaternary ammonium radicals such as:

(a) Quaternary piperidinium radicals, for example

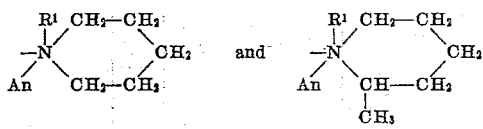

(b) Quaternary morpholinium radicals, for example

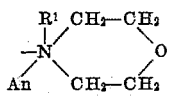

(c) Quaternary pyrrolidinium radicals, for example

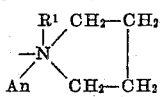

and (d) Quaternary thiamorpholinium radicals, for example

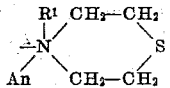

It will be appreciated that the unattached valence bond on the nitrogen represented in the structures for the above radicals is, in the formula for a complete molecule, attached to one of the valence bonds of the divalent alkylene radical Y or $Y^1$.

The divalent lower alkylene bridges represented by the groups Y and $Y^1$ in my compounds interpose 2–5 carbon atoms between the two nitrogen atoms connected by the bridge and include alpha, omega-alkylene radicals such as 1,2-ethylene, $-CH_2-CH_2-$; 1.3-propylene

1,4-butylene $-CH_2-CH_2-CH_2-CH_2-$; and 1,5-amylene $-CH_2-(CH_2)_3-CH_2-$. Radicals of the foregoing type wherein one or more carbon atoms of the bridge bear one or more methyl or ethyl groups as substituents, as represented for example by the 1,2-propylene radical, $-CH(CH_3)-CH_2-$, also fall within the scope of my invention. The groups Y and $Y^1$ preferably contain a total of 2–7 carbon atoms each.

In its preferred scope, therefore, my invention relates to new quaternary ammonium compounds having the formulas

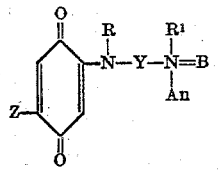

and

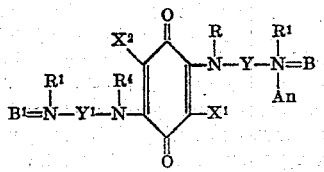

where Z is a member of the class consisting of hydrogen, lower alkylamino radicals, and di-(lower alkyl)amino radicals; R and $R^4$ are members of the class consisting of hydrogen and methyl; $R^1$ is a member of the class consisting of benzyl radicals containing 7–10 carbon atoms, lower alkyl radicals, and lower alkenyl radicals; Y and $Y^1$ are each a lower alkylene bridge interposing 2–5 carbon atoms between the two nitrogen atoms connected by the bridge; N=B and $N=B^1$, which are identical with, and alternatively designated by, the symbols $NR^2R^3$ and $NR^5R^6$, respectively, are members of the class consisting of 1-piperidyl, 4-morpholinyl, 4-thiamorpholinyl, 1-pyrrolidyl, and di-(lower alkyl) amino radicals; $X^1$ and $X^2$ are identical members of the class consisting of hydrogen, chlorine, and bromine; and An is a non-toxic anion.

The novel quaternary ammonium compounds of my invention are useful as curarimimetic agents. They are formulated for parenteral use in the manner employed with known curarimimetic or neuromuscular blocking agents such as tubocurarine chloride. Thus, for example they are usually formulated in aqueous solution containing a few milligrams, for instance 2–3 mg., of the compound per ml. of solution. A particularly preferred species of my invention is 2,5-bis-(3-diethylaminopropyl-amino)-p-benzoquinone bis-(benzyl chloride) disclosed in Example 1B below; a representative formulation of this compound is an aqueous solution containing 3 mg. of the compound per ml. and, when used intravenously as a skeletal muscle relaxant during surgical procedures in man, an initial dose of 6–15 mg. (2–5 ml. of the solution) is employed.

The preparation of my new quaternary compounds is conveniently carried out in many instances by direct quaternization of the appropriate N-[(tertiary amino)alkyl]amino-p-benzoquinones. Thus, for example, p-benzoquinones containing the (tertiary amino)alkylamino grouping $-NR-Y-NR^2R^3$ attached to the 2-position, or 2- and 5-positions, of the p-benzoquinone nucleus are quaternized by treatment with an alkylating agent which is an ester of an aliphatic or araliphatic alcohol having the formula $R^1-OH$ with a strong organic or inorganic acid, said ester having the formula $R^1-An^1$, where $An^1$ is the non-toxic anion of the strong organic or inorganic acid. A preferred group of these alkylating agents comprises esters of primary aliphatic and araliphatic alcohols with strong organic or inorganic acids. These agents include for example, methyl iodide, methyl bromide, methyl p-toluenesulfonate, dimethyl sulfate, ethyl iodide, ethyl p-toluenesulfonate, ethyl chloroacetate, n-propyl iodide, allyl chloride, allyl bromide, n-hexyl bromide, benzyl chloride, benzyl bromide, p-methoxybenzyl chloride, p-chlorobenzyl chloride, etc. The esters of methyl, ethyl, allyl, and benzyl alcohols are especially useful. The general quaternization reaction proceeds according to the following equation for the formation of mono-quaternary compounds:

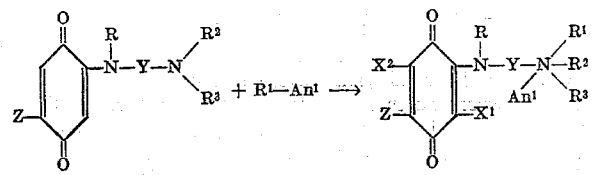

It will be appreciated that when bis-quaternary ammonium compounds are to be formed, the original amine employed for obtaining the above starting material has the formula

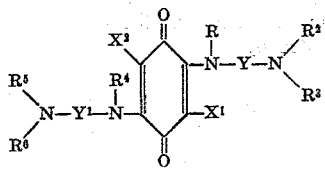

and the two moles of the ester, $R^1-An^1$, which are required for the complete quaternization reaction can be added more conveniently in a single step. The quaternization of the amines is simply and conveniently carried out by mixing the selected amine with one or two molecular equivalents of the ester, $R^1-An^1$, as required, plus an excess of the ester if desired. The reaction of the ester with the amine can be facilitated by heating the reaction mixture. This is especially advantageous when employing an araliphatic ester such as benzyl chloride as the quaternizing agent, but may be unnecessary or undesirable, for example, in the case of a low-boiling lower alkyl ester where the reaction proceeds with sufficient rapidity at room temperature.

In those instances where the anion, An, in my new compounds is derived from a relatively weak acid such as citric acid or tartaric acid, the direct addition of the ester $R^1$—An to the tertiary amine does not readily occur due to the properties of the particular ester employed. In such cases it is possible by use of metathetical reactions to replace the anion $An^1$ of one quaternary ammonium salt by a different anion An without reconversion to the tertiary amine. This is usually effected by treatment of an aqueous solution of the quaternary ammonium salt containing the anion $An^1$ with silver oxide (hydroxide). The silver salt Ag—$An^1$ is precipitated, leaving in solution the quaternary ammonium hydroxide. It is prerequisite, of course, that the salt Ag—$An^1$ be insoluble in water. The quaternary ammonium hydroxide may then be neutralized with the appropriate acid H—An, which can be either a strong or a weak organic or inorganic acid, to give any desired salt with a pharmaceutically acceptable anion.

The starting amines required for the above quaternization procedures can be prepared conveniently by the following procedures. When $X^1$ and $X^2$ are hydrogen those amines having one (tertiary amino)alkylamino group, NR—Y—$NR^2R^3$, are obtained by interacting a p-benzoquinone having the formula

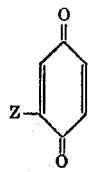

with one molecular equivalent of a primary or secondary N-[(tertiary amino)alkyl]-amine under conditions of mild oxidation, such as obtained by passing air or, preferably, oxygen through the reaction mixture during the reaction period, which generally requires several hours and is conveniently carried out overnight, i. e. for 6–20 hours, or longer. The reaction proceeds according to the following equation:

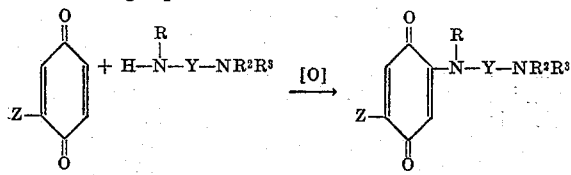

When Z is hydrogen, a second (tertiary amino)alkylamino group can be introduced readily into the 5-position of the 2-[(tertiary amino)alkylamino]-p-benzoquinone by causing a second molecular equivalent of the alkylenediamine, NH(R)Y—$NR^2R^3$, to react, yielding a symmetrical compound. Thus,

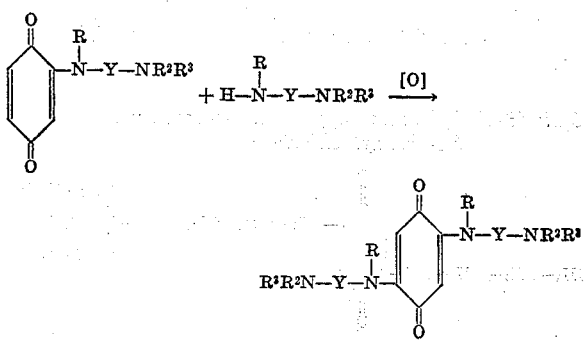

On the other hand, when the second equivalent of alkylenediamine is structurally different from the first, an unsymmetrical disubstituted product is obtained, as represented by the following equation:

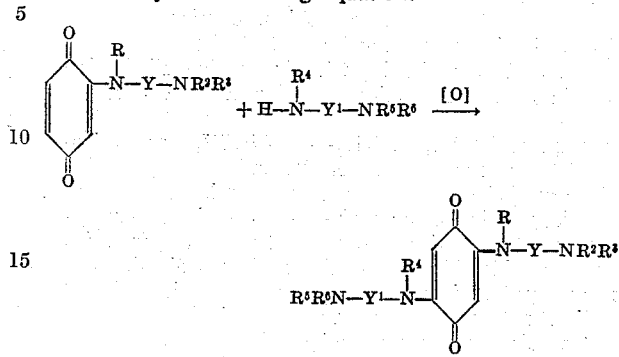

The 2-[(tertiary amino)alkylamino]-p-benzoquinones also react with primary and secondary alkylamines under conditions of mild oxidation to introduce a 5-alkylamino or 5-dialkylamino group, respectively, into the p-benzoquinone nucleus, as illustrated by the following equation:

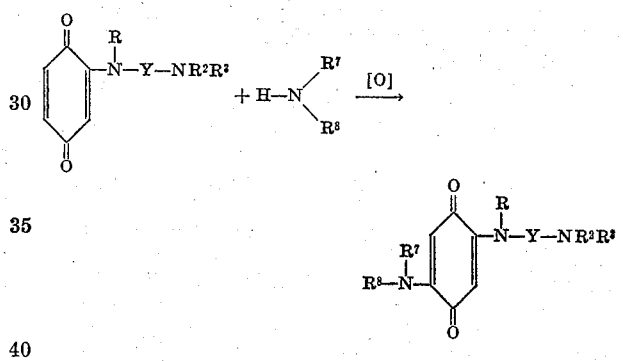

where $R^7$ is a lower alkyl radical containing 1–7 carbon atoms and $R^8$ is hydrogen or a lower alkyl radical containing 1–7 carbon atoms. In the preparation of 2-[(tertiary amino)alkylamino] - 5 - (mono- or di-alkyl)-amino-p-benzoquinones, the introduction of the groups at the 2- and 5-positions of the p-benzoquinone nucleus can be carried out in alternative sequence. However, I prefer to introduce the 2-(tertiary amino)alkylamino group first, and then the 5-(alkyl- or di-alkyl)amino group, since in this sequence fewer isolation problems are encountered. The quaternization of these 2-[(tertiary amino)alkylamino]-5-(mono- or di-alkyl)amino-p-benzoquinones is illustrated by the following equation:

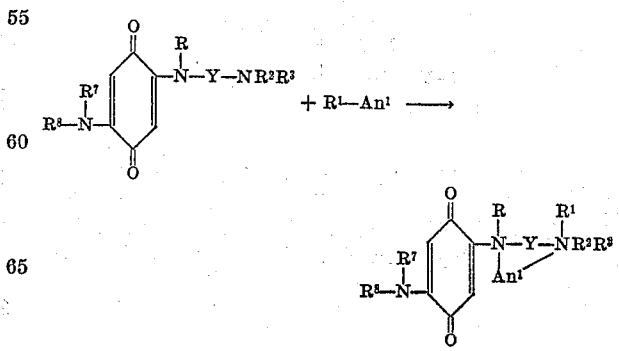

If it is desired that the (tertiary amino)alkylamino groups introduced at positions 2 and 5 of the p-benzoquinone nucleus as above-described be identical, the reaction can be carried out either in one operation by reacting p-benzoquinone with two molecular equivalents of the alkylenediamine or, less conveniently, in two steps, introducing first one (tertiary amino)alkylamino group and then the other. When, on the other hand, it is desired to introduce different (tertiary amino)alkylamino groups at positions 2 and 5, the reaction must of course be carried out in stepwise fashion, causing first one alkylenediamine to react and then the other.

The introducton of a single (tertiary amino)alkylamino group into the p-benzoquinone nucleus can be carried out by employing substantially one molecular equivalent of the alkylenediamine, NH(R)—Y—NR²R³, per equivalent of the p-benzoquinone, or alternatively, the reaction can be carried out in concentrated solution so that the 2-(tertiary aminoalkylamino) - p - benzoquinone precipitates from the reaction medium as it is formed, in which case a considerable excess of the alkylenediamine can be employed to increase the speed of reaction without the disadvantage of producing an appreciable quantity of the 2,5 - bis-(tertiary aminoalkylamino)-p-benzoquinone when the bis compound is an undesired by-product.

Instead of employing p-benzoquinone as such, hydroquinone can be employed as the starting material, the hydroquinone being converted by the oxidizing atmosphere (furnished, for example, by use of a mild oxidizing agent such as hydrogen peroxide, oxygen, air, a quinone, etc.) of the reaction mixture to p-benzoquinone. However, when hydroquinone is employed, the reaction time required is increased, and therefore I prefer to use p-benzoquinone itself.

The use of oxygen in maintaining the oxidizing atmosphere in the reaction mixture is generally to be preferred over use of air, since the reaction proceeds more rapidly when oxygen is employed. However, the use of air offers a useful alternative when oxygen is not available. In the preparation of mono-(tertiary amino)alkylamino-p-benzoquinones, it is convenient to employ an excess of the p-benzoquinone amounting to about one molecular equivalent or more in the reaction to function as a mild oxidizing agent, in which case the use of gaseous oxygen or air is not necessary. This procedure has the added advantage that the reaction time required is usually only about one-half to one hour, while when oxygen or air is used as the oxidizing agent the reaction time is usually at least several hours. The interaction of the p-benzoquinone with the alkylenediamine is advantageously carried out in a solvent, the choice of which can be made from a wide variety of organic solvents. I have found that dioxane, acetonitrile, and benzene, for example, are excellent solvents for use in my process and are somewhat more satisfactory in this regard than are water and alcohol.

The preparation of the starting amines having the formula

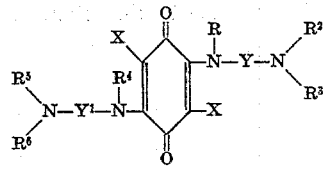

where X is a middle halogen (chlorine or bromine) is effected by interacting chloranil or bromanil, respectively, with the appropriate alkylenediamine, two molecular equivalents of alkylenediamine being employed. The reaction proceeds by splitting out hydrogen halide, and oxidizing conditions are not required. The reaction proceeds according to the following equation when for example a symmetrical bis compound is desired:

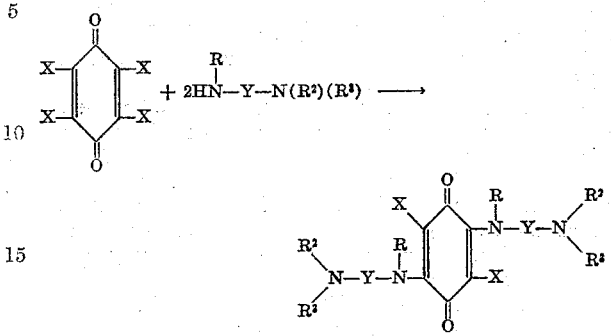

My invention is illustrated by the following examples without, however, being limited thereto. These quaternary ammonium compounds have high curarimimetic activity; when aqueous solutions were assayed in mice by a modification of the inclined screen procedure used by Thompson [Endocrinology, 39, 62 (1946)] for determination of insulin, the compounds showed a general range of $ED_{50}$ (effective dose producing paralysis in 50% of the mice) values from 0.2 to 33 mg./kg. with most of the $ED_{50}$ values being on the order of 0.3–0.9 mg./kg. The $LD_{50}$ (dose causing death by subcutaneous injection in 50% of the mice) values as estimated by the method of Miller and Tainter [Proc. Soc. Exp. Biol. Med., 57, 261 (1944)] ranged from 0.6 to 95 mg./kg. with most of the $LD_{50}$ values being on the order of 0.6–4 mg./kg. The $ED_{50}$ and $LD_{50}$ values for 2,5-bis-(3-diethylaminopropylamino)-p-benzoquinone bis-(benzyl chloride), described for instance in Example 1B, were 0.8 mg./kg. and 2.5 mg./kg., respectively.

EXAMPLE 1

A. *2,5-bis-(3-diethylaminopropylamino)-p-benzoquinone*

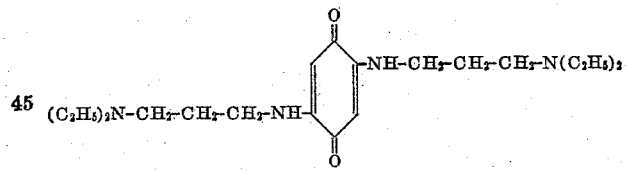

104 g. of N,N-diethyl-1,3-propanediamine was added to 44 g. benzoquinone in 500 ml. of dioxane, with provision for external cooling of the reaction mixture when necessary. Oxygen was bubbled through the solution for approximately 20 hours. The reaction mixture was then cooled in an ice-bath. A red crystalline precipitate formed and this was filtered off and recrystallized from hot ethanol. There was thus obtained, as a red crystalline compound, 35 g. of 2,5-bis-(3-diethylaminopropylamino)-p-benzoquinone which melted at 122–124° C. A small additional crop of this product was obtained by concentration of the dioxane mother liquor.

*Analysis.*—Calculated: N, 15.37%; C, 65.89%; H, 9.96%. Found: N, 15.18%; C, 65.91%; H, 9.68%.

The compound formed a dihydrochloride which was obtained as a red powder which melted at 250–251° C. (dec.).

B. *2,5-bis-(3-diethylaminopropylamino)-p-benzoquinone bis-(benzyl chloride)*

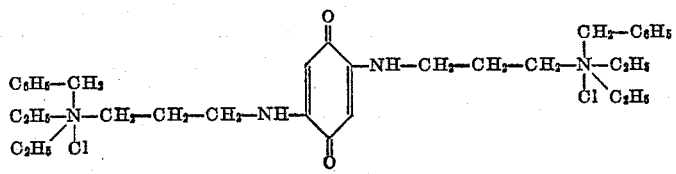

35 g. of 2,5-bis-(3-diethylaminopropylamino)-p-benzoquinone was dissolved in 500 ml. of 95% ethanol, and 60 g. of benzyl chloride was added to the solution. The mixture was refluxed for four hours and was then cooled. An equal volume of ether was added to the reaction mixture, thus precipitating a red oil which crystallized on standing. The precipitate was collected on a filter, and re-precipitated with ether from solution in 95% ethanol twice more. The product was dried in an oven at 80° C. There was thus obtained 51 g. of 2,5-bis-(3-diethylaminopropylamino)-p-benzoquinone bis-(benzyl chloride) as an orange-red solid which melted at 191-195° C. The melting point varied somewhat with the rate of heating. The compound was highly water-soluble.

*Analysis.*—Calculated: N, 9.08%; Cl, 11.48%. Found: N, 9.28%; Cl, 11.68%.

C. *2,5-bis-(3-diethylaminopropylamino)-p-benzoquinone bis-methobromide*

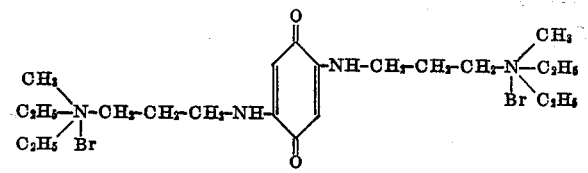

A solution of 5 g. of 2,5-bis-(3-diethylaminopropylamino)-p-benzoquinone in 100 ml. of ethanol was mixed at about 25° C. with methyl bromide. After the mixture had stood for about 2 hours, a precipitate formed (in another run, the precipitate formed after addition of ether to the reaction mixture). The precipitate was collected, washed with dioxane, and dried in an oven at 80° C. There was thus obtained 7.7 g. of 2,5-bis-(3-diethylaminopropylamino)-p-benzoquinone bis-methobromide (which is alternatively named as 2,5-bis-(3-ethylmethylaminopropylamino)-p-benzoquinone bis-ethobromide) as an orange powder which melted at 225° C.

*Analysis.*—Calculated: N, 10.10%; Br, 28.82%. Found: N, 10.38%; Br, 28.95%.

When the quaternization was repeated using a 1:1 mixture of ethanol and dioxane as the solvent, the desired bis-methobromide was obtained in substantially the same yield.

D. Alternatively, the bis-methobromide described in Part C above is prepared by interacting ethyl bromide with 2,5-bis-(3-ethylmethylaminopropylamino)-p-benzoquinone,

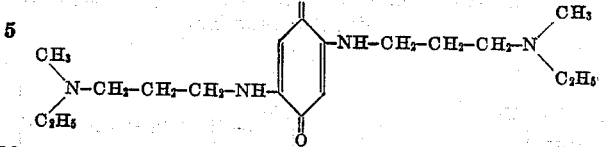

which is obtained by interaction of N-ethyl-N-methyl-1,3-propanediamine and p-benzoquinone in the presence of oxygen by a procedure similar to that described in Part A above.

The compounds described below in the following parts E-P, inclusive, of this example were obtained by interacting 2,5-bis-(3-diethylaminopropylamino)-p-benzoquinone with two equivalents of the appropriate alkylating agent under reaction condition similar to those in the quaternization procedures described hereinabove.

E. *2,5-bis-(3-diethylaminopropylamino)-p-benzoquinone bis-ethiodide*

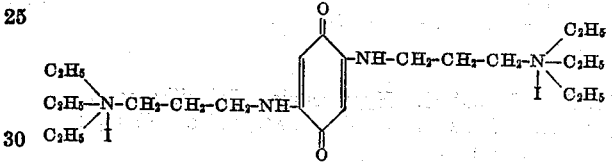

M. P. 231-235° C. Solubility in water, weight/volume, less than 0.25%. Solubility in 95% ethanol, weight/volume, less than 1%.

F. *2,5-bis-(3-diethylaminopropylamino)-p-benzoquinone bis-propobromide*

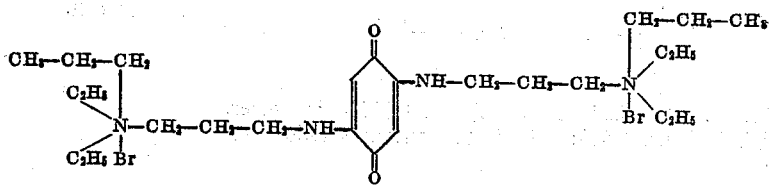

M. P. 223-225° C. Solubility in water, weight/volume, greater than 20%; pH of 1% aqueous solution was 5.7.

G. *2,5-bis-(3-diethylaminopropylamino)-p-benzoquinone bis-butobromide*

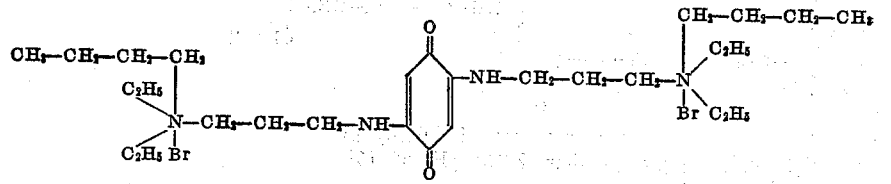

M. P. 209-212° C. Solubility in water, weight/volume, greater than 20%; pH of 1% aqueous solution was 7.2.

H. *2,5-bis-(3-diethylaminopropylamino)-p-benzoquinone bis-ethobromide*

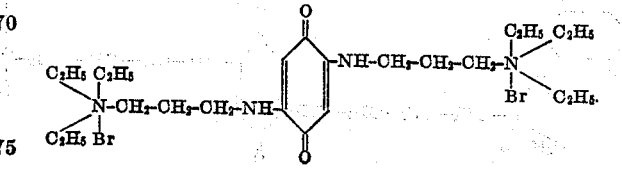

M. P. 240–241° C. Solubility in water, weight/volume, greater than 20%; pH of 1% aqueous solution was 7.6.

I. 2,5-bis-(3-diethylaminopropylamino)-p-benzoquinone bis-(allyl bromide)

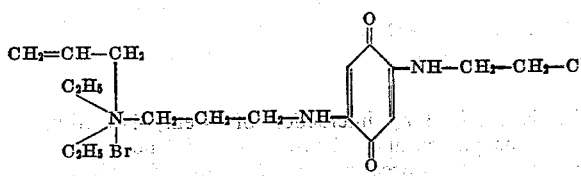

M. P. 222° C. Solubility in water, weight/volume, greater than 20%; pH of 1% aqueous solution was 5.2.

J. 2,5-bis-(3-diethylaminopropylamino)-p-benzoquinone bis-(methallyl chloride)

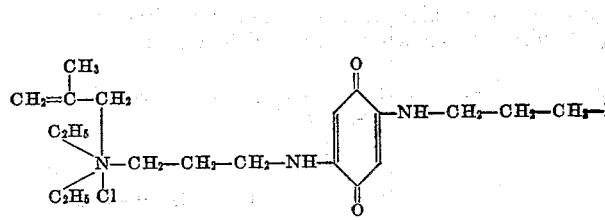

M. P. 198–200° C. Hygroscopic. Solubility in water, weight/volume, greater than 20%; pH of 1% aqueous solution was 7.0.

K. 2,5-bis-(3-diethylaminopropylamino)-p-benzoquinone bis-(p-chlorobenzyl chloride)

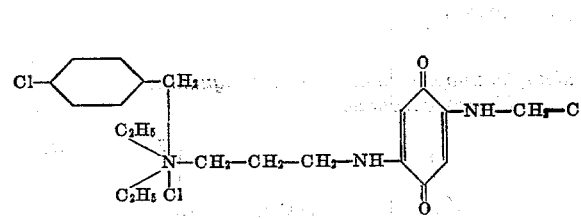

M. P. 204–205° C. (dec.). Solubility in water, weight/volume, 2.5%; pH of 1% aqueous solution was 5.0.

L. 2,5-bis-(3-diethylaminopropylamino)-p-benzoquinone bis-(o-chlorobenzyl chloride)

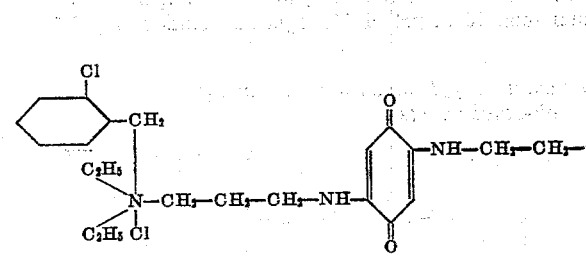

M. P. 117–140° C. Very hygroscopic. Solubility in water, weight/volume, greater than 20%; pH of 1% aqueous solution was 6.5.

M. 2,5-bis-(3-diethylaminopropylamino)-p-benzoquinone bis-(o-methoxybenzyl chloride)

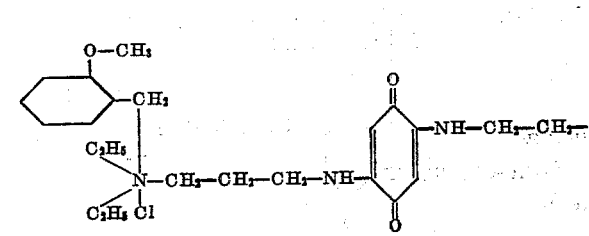

M. P. 182–184° C. Solubility in water, weight/volume, greater than 20%; pH of 1% aqueous solution was 8.7.

N. *2,5-bis-(3-diethylaminopropylamino)-p-benzoquinone bis-(2,3-dimethoxybenzyl chloride)*

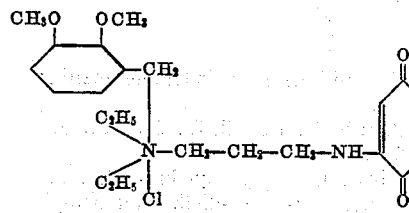
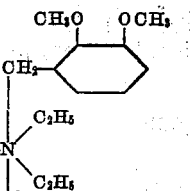

M. P. 148–156° C. Very hygroscopic. Solubility in water, weight/volume, greater than 20%; pH of 1% aqueous solution was 4.5.

O. *2,5-bis-(3-diethylaminopropylamino)-p-benzoquinone bis-(p-nitrobenzyl chloride)*

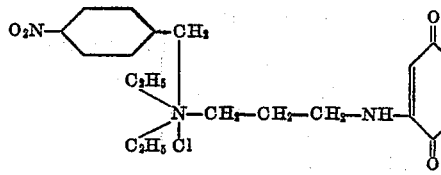

M. P. 195–197.5° C. Solubility in water, weight/volume, less than 0.25%. Solubility in 95% ethanol, weight/volume, less than 1%.

P. *2,5-bis-(3-diethylaminopropylamino)-p-benzoquinone bis-(m-nitrobenzyl chloride)*

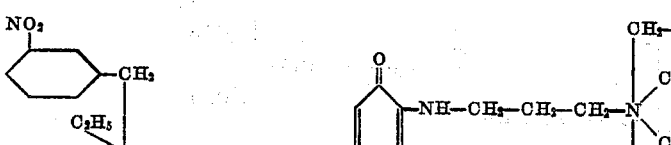
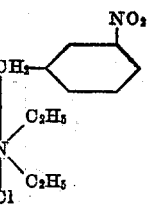

M. P. 190–203° C. Solubility in water, weight/volume, greater than 20%; pH of 1% aqueous solution was 7.6.

EXAMPLE 2

A. *2-(2-dimethylaminoethylamino)-p-benzoquinone*

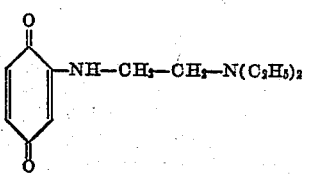

To a solution of 54 g. of p-benzoquinone in 500 ml. of dioxane there was added 115 g. of N,N-diethylethylenediamine, and oxygen was passed into the solution for twenty hours. The reaction mixture was concentrated and the solid product which separated was collected and recrystallized from hot aqueous ethanol. There was thus obtained 54 g. of 2-(2-diethylaminoethylamino)-p-benzoquinone in the form of orange crystals which melted at 119° C.

*Analysis.*—Calculated: N, 12.60%. Found: N, 12.51%.

B. *Quaternary salts of 2-(2-diethylaminoethylamino)-p-benzoquinone*

2-(2-diethylaminoethylamino)-p-benzoquinone was reacted with one molecular equivalent of methyl bromide to yield 2-(2-diethylaminoethylamino)-p-benzoquinone methobromide,

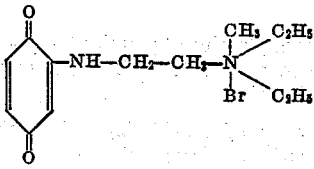

which had an indefinite melting point and decomposed when heated above 225° C.

*Analysis.*—Calculated: N, 8.84%. Found: N, 9.28%.

Alternatively, this compound is prepared by interacting equivalent amounts of ethyl bromide and 2-(2-ethylmethylaminoethylamino)-p-benzoquinone, the tertiary amine reactant being obtained by interaction of one molecular equivalent of N-ethyl-N-methylethylenediamine and p-benzoquinone in the presence of oxygen.

The amine reacts with one molecular equivalent of methyl sulfate to yield 2-(2-diethylaminoethylamino)-p-benzoquinone methosulfate.

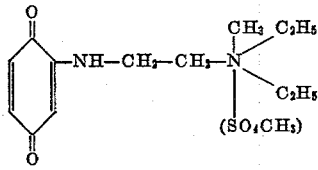

EXAMPLE 3

A. *2,5-bis-(2-diethylaminoethylamino)-p-benzoquinone*

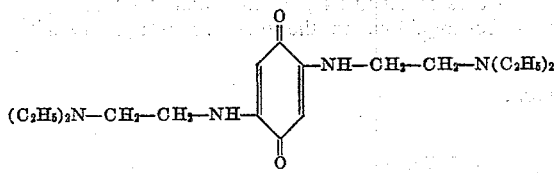

(1) 115 g. of N,N-diethylethylenediamine was added to a solution of 54 g. of p-benzoquinone in 500 ml. of dioxane and the mixture was heated on a steam bath for about twenty hours, during which period oxygen was bubbled through the solution. The reaction mixture was then concentrated at reduced pressure. The resulting residue was recrystallized from hot aqueous ethanol. There was thus obtained 40 g. of 2,5-bis-(2-diethylaminoethylamino)-p-benzoquinone, which melted at 134–135° C.

*Analysis.*—Calculated: N, 16.65%; C, 64.20%; H, 9.58%. Found: N, 16.65%; C, 64.21%; H, 9.40%.

(2) When 42 g. of 2-(2-diethylaminoethylamino)-p-benzoquinone was reacted with 61.5 g. of N,N-diethylethylenediamine under conditions similar to those described in part (1) above, there was obtained 31 g. of 2,5-bis-(2-diethylaminoethylamino)-p-benzoquinone, which melted at 134–135° C. when recrystallized from aqueous ethanol.

B. *Quaternary salts of 2,5-bis-(2-diethylaminoethylamino)-p-benzoquinone*

5.3 g. of 2,5-bis-(2-diethylaminoethylamino)-p-benzoquinone was quaternized by heating with 11 g. of benzyl chloride in a manner similar to the procedure described in Example 1B. There was thus obtained 4.5 g. of 2,5-bis-(2-diethylaminoethylamino)-p-benzoquinone bis-(benzyl chloride),

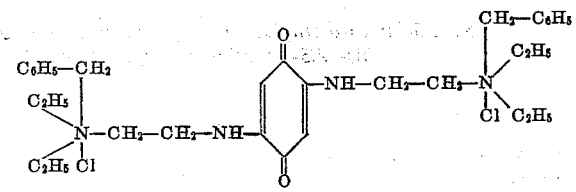

a highly water-soluble solid with an indefinite melting point, ca. 165–180° C.

*Analysis.*—Calculated: N, 9.50%; Cl, 12.02%. Found: N, 9.49%; Cl, 12.36%.

Two molecular equivalents of n-propyl bromide react with the amine to yield 2,5-bis-(2-diethylaminoethylamino)-p-benzoquinone bis-(n-propyl bromide),

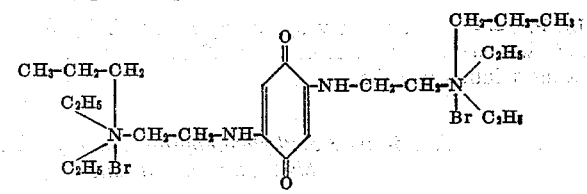

Two molecular equivalents of allyl bromide reacted with the amine to yield 2,5-bis-(2-diethylaminoethylamino)-p-benzoquinone bis-(allyl bromide).

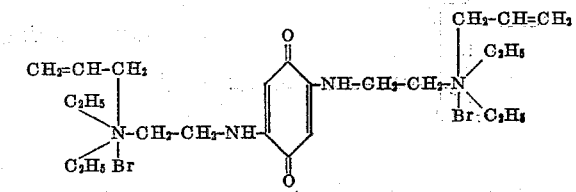

which melted at 233–234° C.

By interaction of the 2,5-bis-(2-diethylaminoethylamino)-p-benzoquinone with two molecular equivalents of p-methylmercaptobenzyl bromide there is produced 2,5-bis-(2-diethylaminoethylamino)-p-benzoquinone bis-(p-methylmercaptobenzyl bromide),

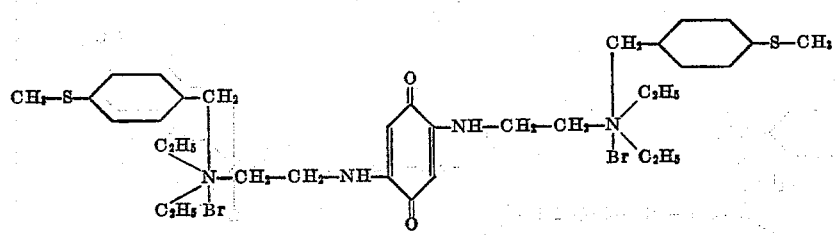

EXAMPLE 4

A. *2,5-bis-[2-(4-morpholinyl)ethylamino]-p-benzoquinone*

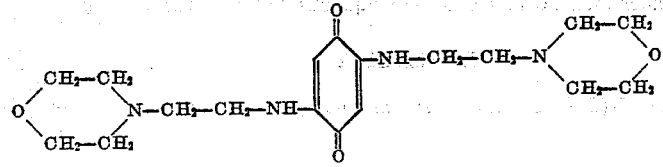

To a solution of 10.8 g. of p-benzoquinone in 250 ml. of dioxane there was added 29 g. of 4-(2-aminoethyl)morpholine and oxygen was bubbled into the solution for about fifty hours. The reaction mixture was then cooled and the crystalline precipitate which was present was collected on a filter and recrystallized from a hot ethanol-dioxane mixture to yield 10.5 g. of 2,5-bis-[2-(4-morpholinyl)ethylamino]-p-benzoquinone as orange crystals, which melted at 189–190° C.

*Analysis.*—Calculated: N, 15.38%; C, 59.32%; H, 7.74%. Found: N, 15.38%; C, 59.31%; H, 7.82%.

B. *Quaternary salts of 2,5-bis-[2-(4-morpholinyl)ethylamino]-p-benzoquinone*

2,5-bis-[2-(4-morpholinyl)ethylamino]-p-benzoquinone was reacted with methyl bromide by a procedure similar to that described in Example 1C, and there was thus B. *Quaternary salts of 2,5-bis-[2-(4-thiamorpholinyl)ethylamino]-p-benzoquinone*

By interaction of 2,5-bis-[2-(4-thiamorpholinyl)ethylamino]-p-benzoquinone with two molecular equivalents of methyl bromide there is obtained 2,5-bis-[2-(4-thiamorpholinyl)ethylamino]-p-benzoquinone bis-methobromide,

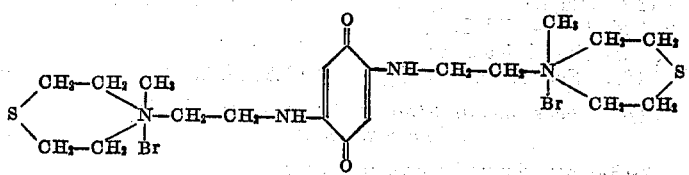

obtained 2,5-bis-[2-(4-morpholinyl)ethylamino]-p-benzoquinone bismethobromide,

When the tertiary amine is reacted with two molecular equivalents of benzyl chloride, there is obtained 2,5-bis-

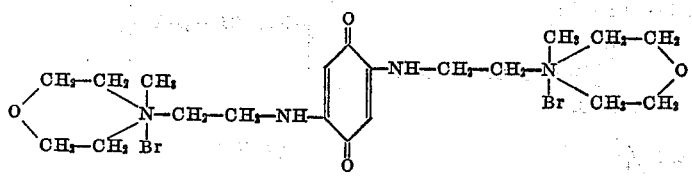

which melted at 231–234° C. (dec.).

*Analysis.*—Calculated: N, 10.10%; Br, 28.02%.

[2-(4-thiamorpholinyl)ethylamino]-p-benzoquinone bis-(benzyl chloride),

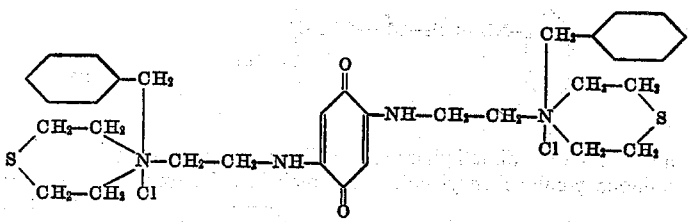

Found: N, 9.84%; Br, 28.12%.

The amine reacts with two molecular equivalents of ethyl iodide to yield 2,5-bis-[2-(morpholinyl)ethylamino]-p-benzoquinone bis-ethiodide,

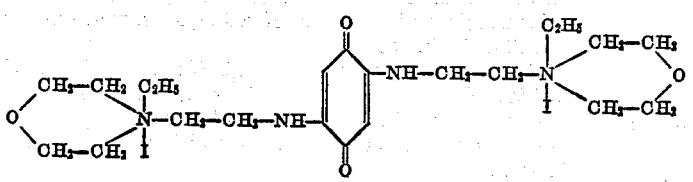

EXAMPLE 5

A. *2,5-bis-[2-(4-thiamorpholinyl)ethylamino]-p-benzoquinone*

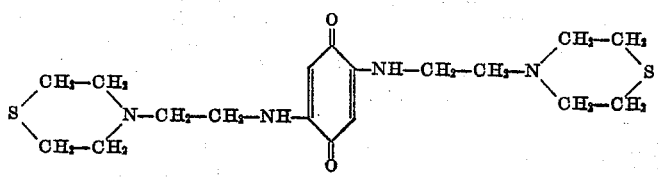

To a solution of 10.8 g. of p-benzoquinone in 250 ml. of dioxane there is added 32 g. of 4-(2-aminoethyl)thiamorpholine and oxygen is bubbled into the solution for about fifty hours. The reaction mixture is then cooled and the precipitate present is collected on a filter and recrystallized from a hot ethanol-dioxane mixture to obtain as an orange-red solid 2,5-bis-[2-(4-thiamorpholinyl)ethylamino]-p-benzoquinone.

EXAMPLE 6

A. *2-(3-dimethylaminopropylamino)-p-benzoquinone*

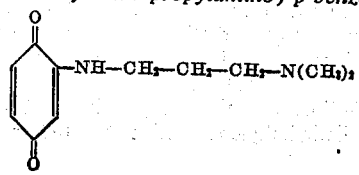

To a solution of 5.4 g. of p-benzoquinone in 50 ml. of dioxane there was added 10.2 g. of N,N-dimethyl-1,3-propylenediamine and the oxygen was bubbled through the solution for four hours. The reaction mixture was then concentrated under reduced pressure and water was added to the residue. The solid which precipitated was collected on a filter and recrystallized from aqueous ethanol. There was obtained in this manner 6.8 g. of 2-(3-dimethylaminopropylamino)-p-benzoquinone, which melted at 159–160° C.

Analysis.—Calculated: N, 13.44%; C, 63.40%; H, 7.74%. Found: N, 13.29%; C, 63.18%; H, 8.05%.

B. Quaternary salts of 2-(3-dimethylaminopropylamino)-p-benzoquinone 2-(3-dimethylaminopropylamino)-p-benzoquinone reacts with benzyl chloride and with p-chlorobenzyl chloride to yield, respectively, 2-(3-dimethylaminopropylamino)-p-benzoquinone benzyl chloride, which has the formula

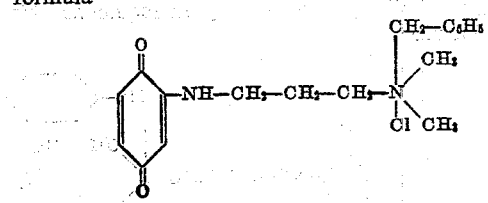

and 2-(3-dimethylaminopropylamino)-p-benzoquinone p-chlorobenzyl chloride, which has the formula

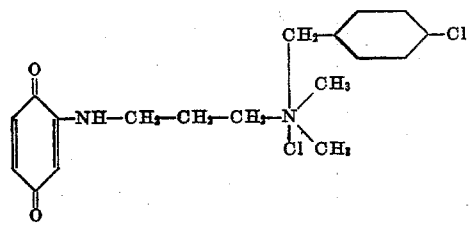

EXAMPLE 7

A. 2-(2-diethylaminoethylamino)-5-(3-dimethylaminopropylamino)-p-benzoquinone

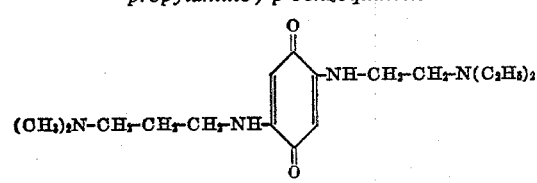

To a solution of 25 g. of N,N-dimethyl-1,3-propanediamine in 500 ml. of dioxane there is added 42 g. of 2-(2-diethylaminoethylamino)-p-benzoquinone and oxygen is bubbled through the mixture for four hours. (Prolonged reaction periods favor the formation of the symmetrical bis compounds as by-products due to disproportionation of the desired unsymmetrical bis compound.) The reaction mixture is then concentrated under reduced pressure and the resulting residue is collected on a filter and recrystallized from hot aqueous ethanol. There is thus obtained 2-(2-diethylaminoethylamino)-5-(3-dimethylaminopropylamino)-p-benzoquinone.

Alternatively, the same product is obtained by interacting 2-(3-dimethylaminopropylamino)-p-benzoquinone with N,N-diethylethylenediamine in the presence of oxygen.

B. Quaternary salts of 2-(2-diethylaminoethylamino)-5-(3-dimethylaminopropylamino)-p-benzoquinone 2-(2-diethylaminoethylamino)-5-(3-dimethylaminopropylamino)-p-benzoquinone reacts with two equivalents of benzyl bromide and with two equivalents of n-propyl chloride, respectively, to yield the benzochloride having the formula

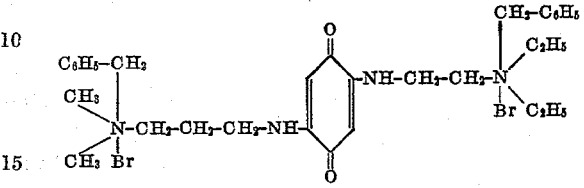

and the propochloride having the formula

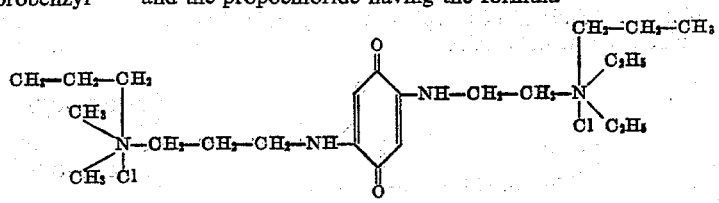

EXAMPLE 8

A. 2-[3-(1-piperidyl)propylamino]-p-benzoquinone

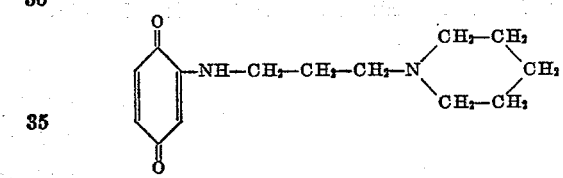

To a solution of 12 g. p-benzoquinone (excess p-benzoquinone employed as oxidizing agent) in 100 ml. of dioxane there was added 7.5 g. of 1-(3-aminopropyl)piperidine and the solution was stirred for one hour. The reaction mixture was then cooled and the crystals which separated from solution were collected on a filter and recrystallized from hot ethanol-dioxane solution. There was thus obtained 5 g. of 2-[3-(1-piperidyl)propylamino]-p-benzoquinone in the form of red crystals, which melted at 200–201° C. (dec.).

Analysis.—Calculated: N, 11.29%; C, 67.71%; H, 8.12%. Found: N, 10.97%; C, 67.38%; H, 8.38%.

The compound formed a hydrochloride which was obtained as a light brown powder which melted at 251–255° C.

B. Quaternary salts of 2-[3-(1-piperidyl)propylamino]-p-benzoquinone

When 2-[3-(1-piperidyl)propylamino]-p-benzoquinone was quaternized by treatment with methyl bromide, using a procedure similar to that described in Example 1C, there was obtained 2[3-(1-piperidyl)propylamino]-p-benzoquinone methobromide,

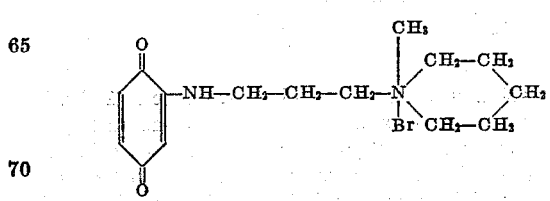

which melted at 255° C.

Analysis.—Calculated: N, 8.17%; Br, 23.28%. Found: N, 8.13%; Br, 23.70%.

The amine reacts with allyl bromide to yield 2-[3-(1-piperidyl)propylamino]-p-benzoquinone allyl bromide,

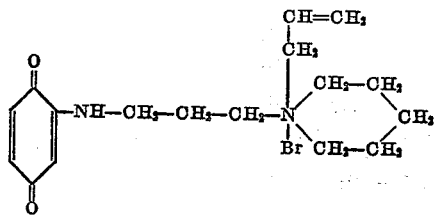

When 1-(3-aminopropyl)-2-methylpiperidine is employed in part A of the foregoing example, there is obtained as a product 2-[3-(2-methyl-1-piperidyl)propylamino]-p-benzoquinone, which interacts with one molecular equivalent of methyl bromide to produce 2-[3-(2-methyl-1-piperidyl)propylamino]-p-benzoquinone methobromide and with one molecular equivalent of ethyl sulfate to yield 2-[3-(2-methyl-1-piperidyl)propylamino-p-benzoquinone ethosulfate.

EXAMPLE 9

A. 2-[3-(1-pyrrolidyl)propylamino] - p - benzoquinone and quaternary salts thereof When 7.3 g. of 1-(3-aminopropyl)pyrrolidine was substituted for the 7.5 g. of 1-(3-aminopropyl)piperidine in the procedure described in Part A of Example 6, there was obtained as the product of the reaction 2-[3-(1-pyrrolidyl)propylamino]-p-benzoquinone, which has the formula

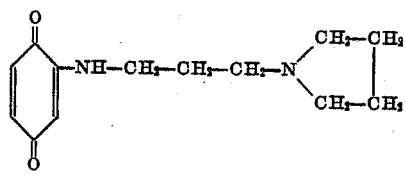

and which reacts with benzyl chloride and with allyl chloride to yield, respectively, 2-[3-(1-pyrrolidyl)propylamino]-p-benzoquinone benzyl chloride, which has the formula

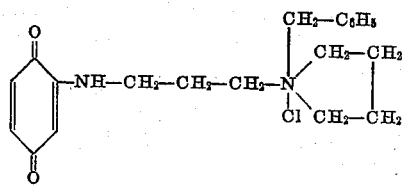

and 2-[3-(1 - pyrrolidyl)propylamino]-p-benzoquinone allyl chloride, which has the formula

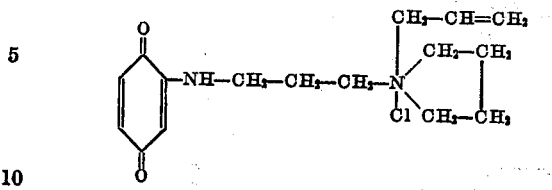

The amine reacted with one equivalent of methyl bromide to form the methobromide having the formula

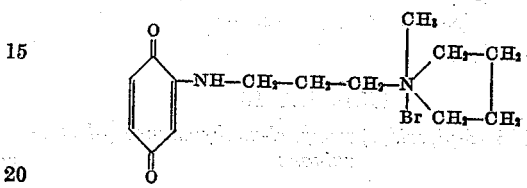

which sintered at 140° C. and melted with decomposition at 239–240° C.

By interaction of the amine with one equivalent of p-acetamidobenzyl bromide there is obtained 2-[3-(1-pyrrolidyl)-propylamino]-p-benzoquinone p-acetamidobenzyl bromide,

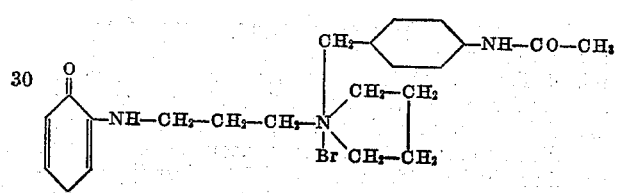

B. 2,5-bis-[3-(1-pyrrolidyl)propylamino]-p-benzoquinone and quaternary salts thereof p-Benzoquinone was interacted with two molecular equivalents of 1-(3-aminopropyl)pyrrolidine to produce 2,5-bis-[3-(1 - pyrrolidyl)propylamino] - p - benzoquinone, having the formula

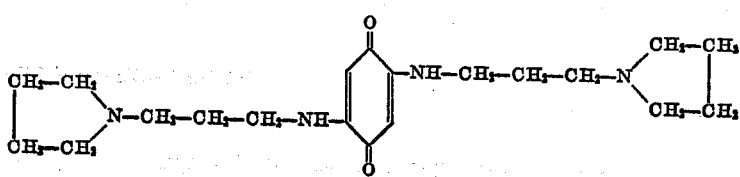

which melted at 155–156° C. Alternatively, this compound is obtained by interacting 2-[3-(1-pyrrolidyl) propylamino]-p-benzoquinone with one molecular equivalent of 1-(3-aminopropyl)pyrrolidine). The bis-tertiary amine reacts with two equivalents of 3-bromobenzyl bromide to yield the bis-(3-bromobenzyl bromide) having the formula

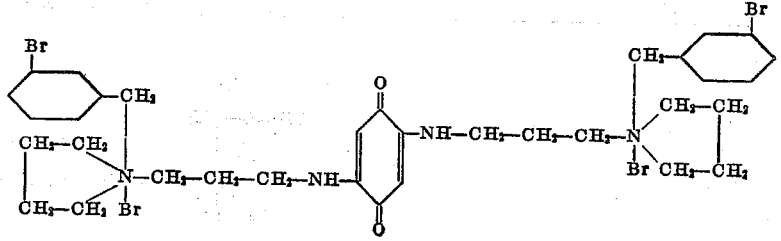

and with two molecular equivalents of p-propoxybenzyl chloride to yield the bis-(p-propoxybenzyl chloride) having the formula

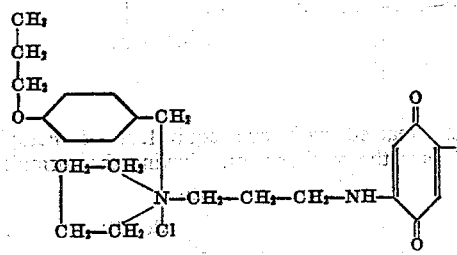

EXAMPLE 10

A. *2-[N-3-(3-piperidyl)propyl-N-methylamino]-p-benzoquinone*

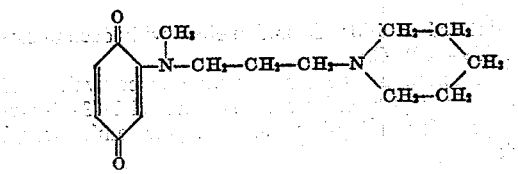

15.6 g. of 1-(3-methylaminopropyl)piperidine was added with cooling to 10.8 g. of p-benzoquinone in 100 ml. of dioxane. Oxygen was then bubbled through the solution for one hour. The reaction mixture was cooled and the crystalline solid which separated was collected on a filter and recrystallized from aqueous ethanol. There was thus obtained 15.5 g. of 2-[N-3-(1-piperidyl)propyl-N-methylamino]-p-benzoquinone in the form of red platelets which melted at 160–161° C.

*Analysis.*—Calculated: N, 10.69%; C, 68.69%; H, 8.44%. Found: N, 10.72%; C, 68.65%; H, 8.67%.

This compound formed a hydrochloride which was obtained as a pink solid which melted at 253–255° C. (dec.).

B. *Quaternary salts of 2-[N-3-(1-piperidyl)propyl-N-methylamino]-p-benzoquinone*

2 - [N-3-(1-piperidyl)propyl-N-methylamino]-p-benzoquinone reacts with n-hexyl iodide to yield 2-[N-3-(1-piperidyl)propyl - N - methylamino] - p - benzoquinone n-hexyl iodide,

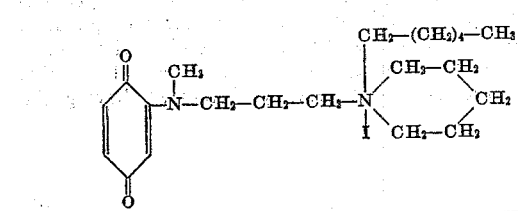

The amine reacted with one equivalent of methyl bromide to yield 2-[N-3-(1-piperidyl)propyl - N - methyl-

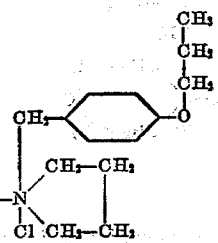

amino]-p-benzoquinone methobromide,

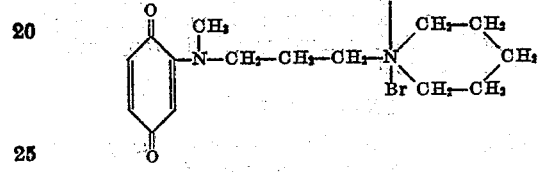

By interaction of the amine with one equivalent of 3-chloro-4-methoxybenzyl bromide, there is obtained 2-[N - 3-(1-piperidyl)propyl-N-methylamino]-p-benzoquinone 3-chloro-4-methoxybenzyl bromide,

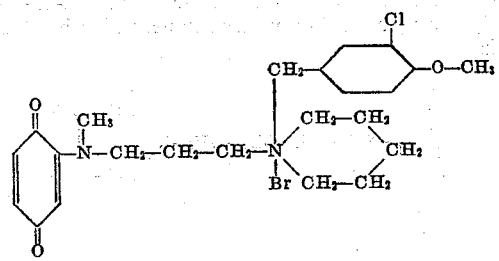

A. *2 - [N - 3-(1-piperidyl)propyl-N-methylamino]-5-(3-dimethylaminopropylamino)-p-benzoquinone*

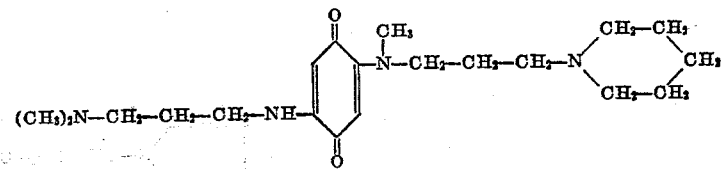

11.2 g. of N,N-dimethyl-1,3-propanediamine is dissolved in 200 ml. of dioxane and to this solution is added 26.2 g. of 2-[N-3-(1-piperidyl)propyl-N-methylamino]-p-benzoquinone. Oxygen is then bubbled through the solution for two hours. The reaction mixture is concentrated and cooled and the solid which separates from solution is collected on a filter. There is thus obtained 2 - [N - 3 - (1 - piperidyl)propyl - N - methylamino] - 5-(3-dimethylaminopropylamino-p-benzoquinone.

B. *Quaternary salts of 2-[N-3-(1-piperidyl)propyl-N-methylamino] - 5 - (3 - dimethylaminopropylamino)-p-benzoquinone*

The tertiary amine prepared as described above reacts with two molecular equivalents of methallyl bromide to yield the bis-(methallyl bromide) having the formula

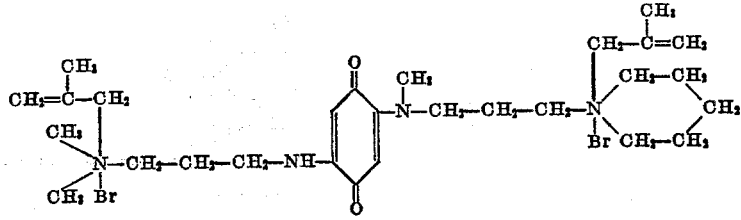

and with two molecular equivalents of p-fluorobenzyl bromide to yield the bis-(p-fluorobenzyl bromide) having the formula

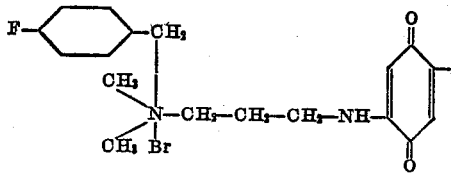

EXAMPLE 12

A. *2,5 - bis - (3 - dimethylaminopropylamino) - p - benzoquinone*

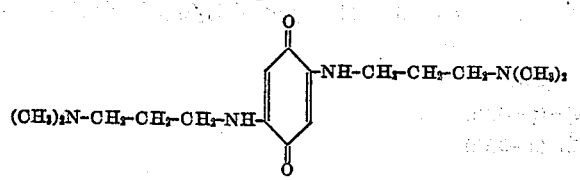

10.2 g. of N,N-dimethyl-1,3-propanediamine was added to 5.4 g. of p-benzoquinone in 100 ml. of dioxane and oxygen was bubbled through the solution for about thirty hours. The reaction mixture was then concentrated under reduced pressure and the residue thus obtained was stirred with ethanol and water. There was thus obtained from the mixture, as an insoluble product, 3 g. of 2,5-bis-(3-dimethylaminopropylamino)-p-benzoquinone in the form of red crystals which after washing with ether melted at 125–126° C.

*Analysis.*—Calculated: N, 18.17%; C, 62.35%, H, 9.15%. Found: N, 17.65%; C, 61.85%; H, 9.16%.

6.03%. Found: N, 9.38%; Cl, 11.87%; H₂O (Karl Fischer method), 5.49%.

Two equivalents of methyl iodide react with the amine

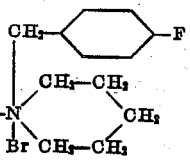

to yield 2,5-bis-(3-dimethylaminopropylamino)-p-benzoquinone bis-methiodide,

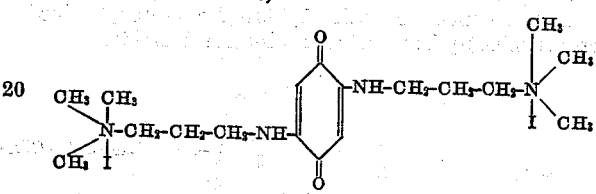

The amine reacted with two molecular equivalents of methyl bromide to yield 2,5-bis-(3-dimethylaminopropylamino)-p-benzoquinone bis-methobromide, which melted at 234–240° C.

The amine reacted with two equilavents of ethyl bromide to yield 2,5-bis-(3-dimethylaminopropylamino)-p-benzoquinone bis-ethobromide, which melted at 245–246° C. This compound is also obtained by interaction of two molecular equivalents of methyl bromide with 2,5-bis-(3-ethylmethylaminopropylamino)-p-benzoquinone.

The amine interacts with two molecular equilavents of p-methylsulfonylbenzyl chloride to yield 2,5-bis-(3-dimethylaminopropylamino-p-benzoquinone bis-(p-methylsulfonylbenzyl chloride),

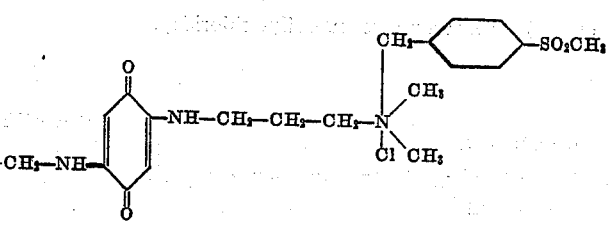

EXAMPLE 13

A. *2,5 - bis - (3 - di - n - propylaminopropylamino) - p - benzoquinone*

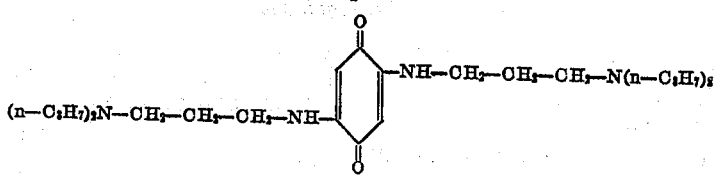

B. *Quaternary salts of 2,5-bis-(3-dimethylaminopropylamino)-p-benzoquinone*

Using a procedure similar to that described in Example 1B, 2,5-bis-(3-dimethylaminopropylamino)-p-benzoquinone was heated with an ethanolic solution of benzyl chloride, thus yielding 2,5-bis-(3-dimethylaminopropylamino)-p-benzoquinone bis-(benzyl chloride) as the dihydrate,

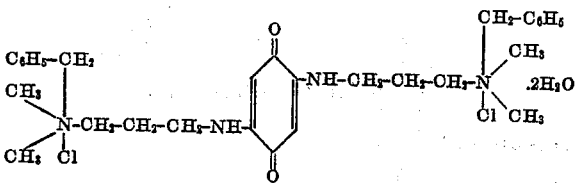

which had an indefinite melting point, ca. 205–225° C.
*Analysis.*—Calculated: N, 9.38%; Cl, 11.87%; H₂O, To a solution of 8.1 g. of p-benzoquinone in 150 ml. of dioxane there was added 23.7 g. of N,N-di-n-propyl-1,3-propanediamine, and oxygen was bubbled through the solution for forty hours. The reaction mixture was concentrated under reduced pressure and the residue was diluted with water. An oil which later solidified separated from the aqueous layer. This solid product was crystallized from hot petroleum ether. There was thus obtained 14.5 g. of 2,5 - bis-(3-di-n-propylaminopropylamino)-p-benzoquinone in the form of red crystals which melted at 65–66° C.

*A n a l y s i s.*—Calculated: N, 13.34%. Found: N, 13.52%.

B. *Quaternary salts of 2,5 - bis - (3 - di - n - proplyaminopropylamino)-p-benzoquinone*

2,5 - bis - (3 - di - n - propylaminopropylamino) - p - benzoquinone was quaternized by treatment with two molecular equivalents of benzyl chloride to yield 2,5-bis-(3-di-n-propylaminopropyl)-p-benzoquinone bis-(benzyl chloride),

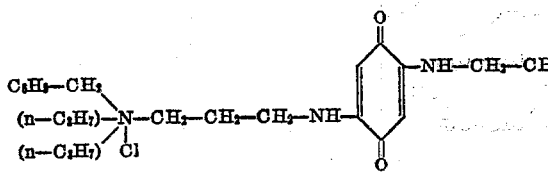

which had an indefinite melting point.

The amine reacted with two molecular equivalents of methyl bromide to yield 2,5-bis-(3-di-n-propylaminopropylamino)-p-benzoquinone bis-methobromide,

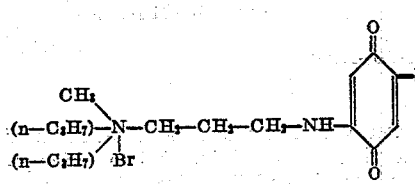

which melted at 202–204° C.

The amine reacts with two molecular equivalents of allyl chloride to yield 2,5-bis-(3-di-n-proplyaminopropylamino)-p-benzoquinone bis-(allyl chloride),

EXAMPLE 14

A. *2,5 - bis - [3 - (1 - piperidyl)propylamino] - p - benzoquinone*

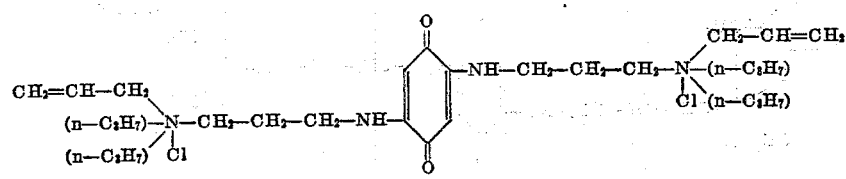

To 3.6 g. of 2-[3-(1-piperidyl)propylamino]-p-benzoquinone in 150 ml. of hot dioxane there was added 4 g. of 1-(3-aminopropyl)piperidine, and oxygen was passed into the hot solution for twenty hours. The reaction mixture was then cooled. The solid which separated from solution was collected on a filter and recrystallized from hot ethanol. There was thus obtained 3 g. of 2,5-bis-[3-(1-piperidyl)propylamino]-p-benzoquinone in the form of orange-red crystals which melted at 179–181° C.

*Analysis.*—Calculated: N, 14.42%; C, 68.00%; H, 9.34%. Found: N, 14.26%; C, 68.24%; H, 9.59%.

B. *Quaternary salts of 2,5 - bis - [3-(1-piperidyl)propylamino]-p-benzoquinone*

2,5 - bis - [3 - (1 - piperidyl)propylamino] - p - benzoquinone was quaternized by treatment with methyl bromide to yield 2,5-bis-[3-(1-piperidyl)propylamino]-p-benzoquinone bis-methobromide,

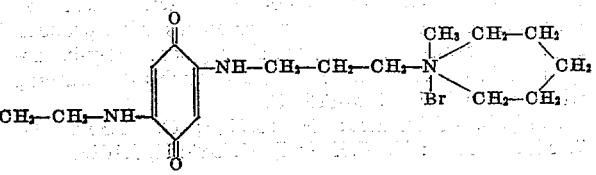

which melted at 253° C. (dec.).

*Analysis.*—Calculated: N, 9.68%; Br, 27.60%. Found: N, 9.63%; Br, 27.35%.

The amine reacted with two molecular equivalents of benzyl chloride to yield 2,5-bis-[3-(1-piperidyl)propylamino]-p-benzoquinone bis-(benzyl chloride),

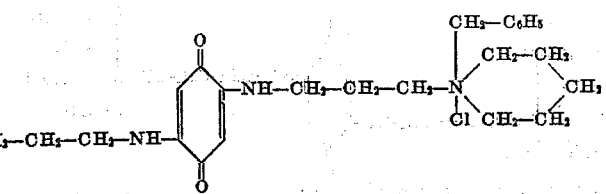

which melted at 175–200° C.

EXAMPLE 15

A. 2,5 - bis - [N - 3 - (1 - piperidyl)propyl-N-methyl-amino]-p-benzoquinone

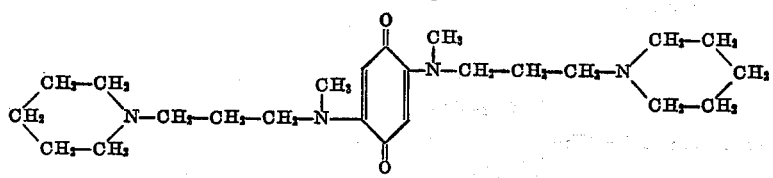

15.6 g. of 1-(3-methylaminopropyl)piperidine was added with cooling to a solution of 5.4 g. of p-benzoquinone in 150 ml. of dioxane and oxygen was then bubbled through the warm solution for twenty hours.

The reaction mixture was concentrated under reduced pressure. The concentrated mixture was cooled, and the red crystals which separated were collected and recrystallized from aqueous ethanol. There was thus obtained 8.2 g. of 2,5 - bis - [N-3-(1-piperidyl)-propyl-N-methylamino]-p-benzoquinone, which melted at 117–118° C.

*Analysis.*—Calculated: N, 13.47%; C, 69.19%; H, 9.68%. Found: N, 13.75%; C, 69.48%; H, 9.74%.

B. Quaternary salts of 2,5-bis-[N-3-(1-piperidyl)propyl-N-methylamino]-p-benzoquinone 5 g. of 2,5 - bis - [N - 3-(1-piperidyl)propyl-N-methylamino]-p-benzoquinone was quaternized by treatment with methyl bromide to yield 5.4 g. of 2,5-bis-[N-3-(1-piperidyl)propyl - N - methylamino]-p-benzoquinone bis-methobromide, The amine reacts with two equivalents of p-methoxybenzyl chloride to yield 2,5-bis-[N-3-(1-piperidyl)propyl-N-methylamino]-p-benzoquinone bis-(p - methoxybenzyl chloride),

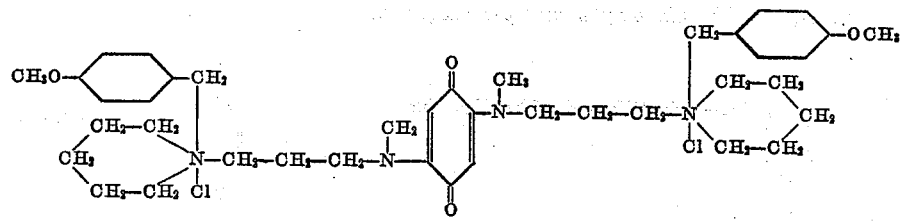

EXAMPLE 16

A. 2,5-bis-[3-(4-morpholinyl)propylamino]-p-benzoquinone

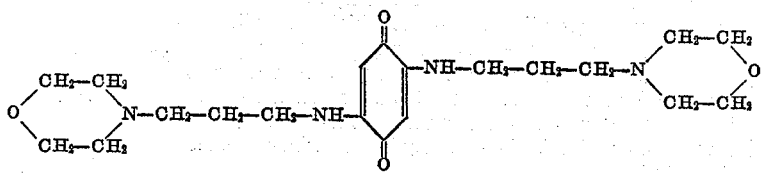

To a solution of 10.8 g. of p-benzoquinone in 75 ml. of dioxane there was added 14.4 g. of 4-(3-aminopropyl)-morpholine, and oxygen was bubbled through the solution for 10 hours. The reaction mixture was cooled and the orange-red crystals which separated were collected on a filter and recrystallized from hot ethanol. There was thus obtained 8 g. of 2,5-bis-[3-(4-morpholinyl)-propylamino]-p-benzoquinone, which melted at 200° C.

*Analysis.*—Calculated: N, 14.28%; C, 61.19%; H, 8.22%. Found: N, 14.16%; C, 60.98%; H, 8.50%.

B. Quaternary salts of 2,5-bis-[3-(4-morpholinyl)-propylamino]-p-benzoquinone 2,5-bis-[3-(4-morpholinyl)propylamino] - p - benzoquinone was quaternized by treatment with methyl bromide to yield 2,5-bis-[3-(4-morpholinyl)propylamino]-p-benzoquinone bis-methobromide,

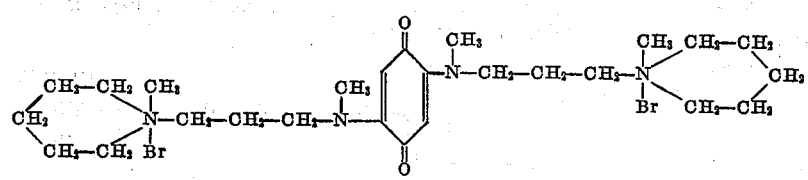

which melted at 245–250° C. (dec.).
*Analysis.*—Calculated: N, 9.25%; Br, 26.39%.

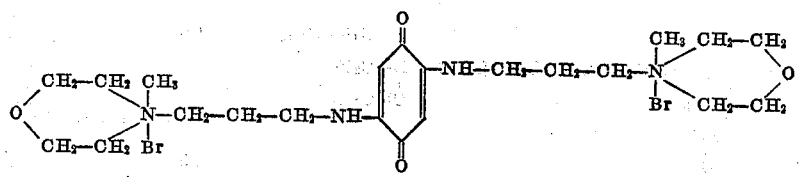

Found: N, 8.71%; Br, 25.95%.

which melted at 248° C. (dec.).

*Analysis.*—Calculated: N, 9.63%; Br, 27.47%. Found: N, 9.33%; Br, 27.20%.

The amine reacts with two equivalents of benzyl chloride to yield 2,5-bis-[3-(4-morpholinyl)propylamino]-p-benzoquinone bis-(benzyl chloride),

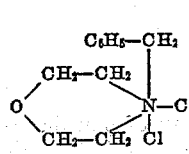

EXAMPLE 17

A. *2-(4-diethylaminobutylamino)-p-benzoquinone*

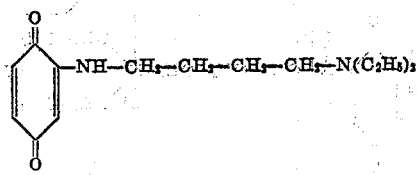

(1) To 8.7 g. of p-benzoquinone in 100 ml. of dioxane there was added 23 g. (one equivalent plus an excess) of N,N-diethyl-1,4-butanediamine and oxygen was passed into the reaction mixture for about twenty hours. There was obtained a crystalline precipitate which was collected on a filter. The mother liquors were concentrated to yield a second crop of the product. The combined crops of product were recrystallized from an ethanol-water mixture. There was obtained in this manner 8.8 g. of 2-(4-diethylaminobutylamino)-p-benzoquinone, which melted at 123–125° C.

*Analysis.*—Calculated: N, 11.19%; C, 67.16; H, 8.86. Found: N, 11.23%; C, 67.24; H, 9.08.

(2) When the preparation described in A (1) above was repeated, using substantially one equivalent of the alkylenediamine instead of an excess, the yield of 2-(4-diethylaminobutylamino)-p-benzoquinone obtained was only slightly less than that obtained in A (1).

B. *Quaternary salts of 2-(4-diethylaminobutylamino)-p-benzoquinone*

2-(4-diethylaminobutylamino)-p-benzoquinone was quaternized by treatment with one molecular equivalent of methyl bromide to yield 2-(4-diethylaminobutylamino)-p-benzoquinone methobromide,

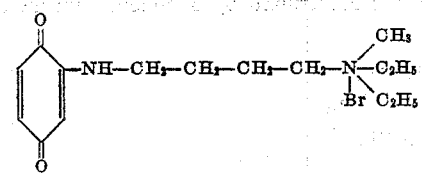

which melted at 146–148° C.

The amine reacts with benzyl chloride to yield 2-(4-diethylaminobutylamino)-p-benzoquinone benzyl chloride,

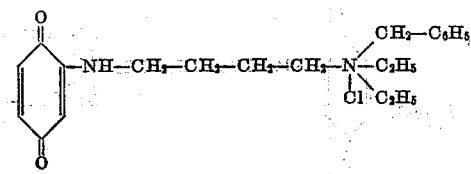

By interaction of the amine with one equivalent of 2,4,5-trichlorobenzyl chloride, there is obtained 2-(4-di-

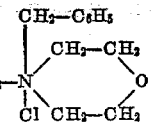

ethylaminobutylamino)-p-benzoquinone 2,4,5-trichlorobenzyl chloride,

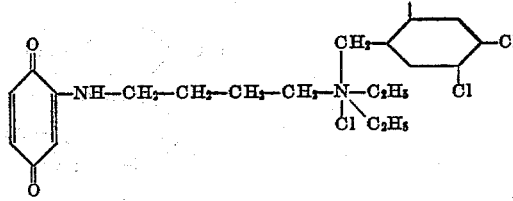

EXAMPLE 18

A. *2-(4-diethylaminobutylamino)-5-methylamino-p-benzoquinone*

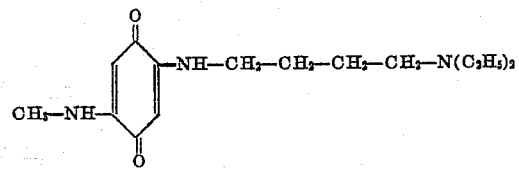

3 g. of 2-(4-diethylaminobutylamino)-p-benzoquinone was dissolved in 100 ml. of dioxane, and methylamine and oxygen were bubbled simultaneously into the solution for two hours. The solution was concentrated under reduced pressure and the residue was dissolved in benzene. The benzene solution was dried over sodium sulfate, filtered, and petroleum ether was added to the solution, thereby precipitating 1 g. of 2-(4-diethylaminobutylamino)-5-methylamino-p-benzoquinone, a yellow solid which melted at 103–106° C.

*Analysis.*—Calculated: C, 64.48%; H, 9.02%. Found: C, 64.28%; H, 9.04%.

B. *Quaternary salts of 2-(4-diethylaminobutylamino)-5-methylamino-p-benzoquinone*

2-(4-diethylaminobutylamino)-5-methylamino-p-benzoquinone reacts with benzyl chloride and with methyl sulfate to yield, respectively, 2-(4-diethylaminobutylamino)-5-methylamino-p-benzoquinone benzyl chloride, which has the formula

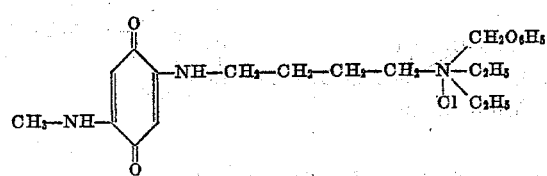

and 2-(4-diethylaminobutylamino)-5-methylamino-p-benzoquinone methosulfate, which has the formula

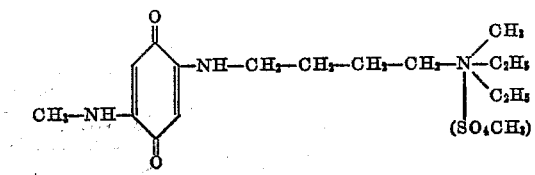

EXAMPLE 19

*2-(4-diethylaminobutylamino)-5-dimethylamino-p-benzoquinone and quaternary salts thereof*

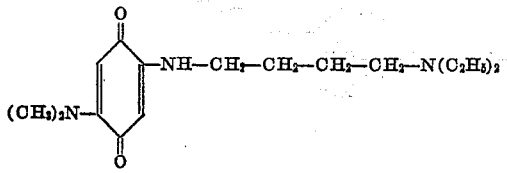

By substituting dimethylamine for the methylamine employed in Example 18A, there is obtained as the product of the reaction 2-(4-diethylaminobutylamino)-5-dimethylamino-p-benzoquinone, which reacts with allyl bromide and with methyl p-toluenesulfonate to yield, respectively, 2 - (4 - diethylaminobutylamino) - 5 - dimethylamino-p-benzoquinone allyl bromide, which has the formula

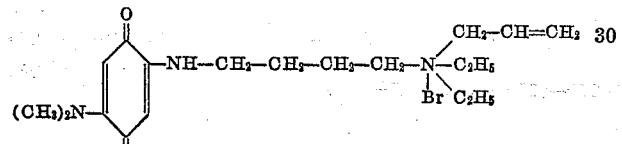

and 2 - (4 - diethylaminobutylamino) - 5 - dimethylamino-

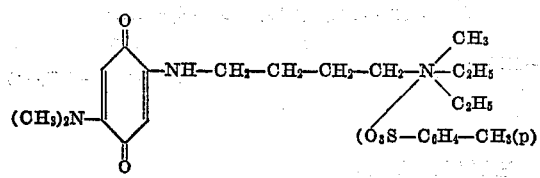

p-benzoquinone methyl p-toluenesulfonate, which has the formula

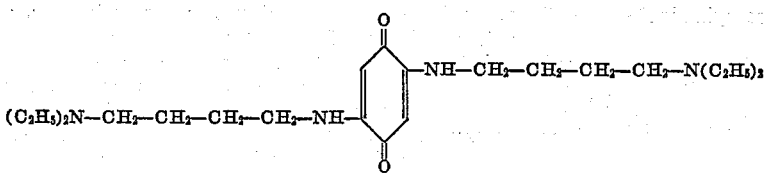

(a 50% excess) of N,N-diethyl-1,4-butanediamine, and oxygen was passed into the mixture while keeping the temperature of the mixture at 35–40° C. for about thirty hours. The solution was then concentrated and the residue thus obtained was recrystallized from hot petroleum ether. There was obtained 4.5 g. of 2,5-bis-(4-diethylaminobutylamino)-p-benzoquinone, which melted at 105–106° C.

*Analysis.*—Calculated: N, 14.28%; C, 67.45%; H, 10.28%. Found: N, 14.12%; C, 67.69%; H, 10.41%.

B. *Quaternary salts of 2,5 - bis - (4 - diethylaminobutylamino)-p-benzoquinone*

2,5 - bis - (4 - diethylaminobutylamino) - p - benzoquinone was quaternized with two equivalents of methyl bromide to yield 2,5-bis-(4-diethylaminobutylamino)-p-benzoquinone bis-methobromide,

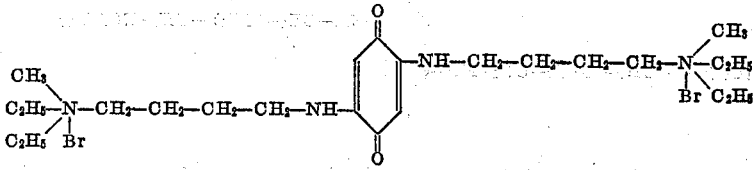

which melted at 229–230° C.

*Analysis.*—Calculated: N, 9.66%; Br, 27.55%. Found: N, 9.31%; Br, 27.65%.

The amine reacted with two molecular equivalents of benzyl chloride to yield 2,5-bis-(4-diethylaminobutylamino)-p-benzoquinone bis-(benzyl chloride), having the structural formula

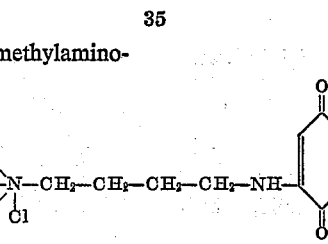

which was a red, amorphous compound having an indefinite melting point.

Similarly, the amine reacts with ethyl chloride to yield 2,5 - bis - (4 - diethylaminobutylamino) - p - benzoquinone bis-ethochloride, having the structural formula

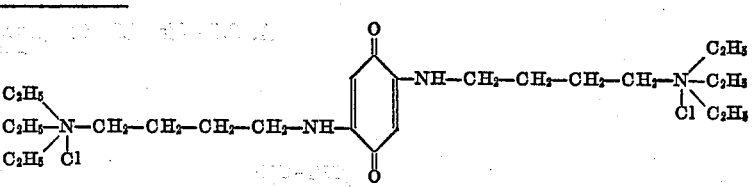

EXAMPLE 20

A. *2,5 - bis - (4 - diethylaminobutylamino) - p - benzoquinone*

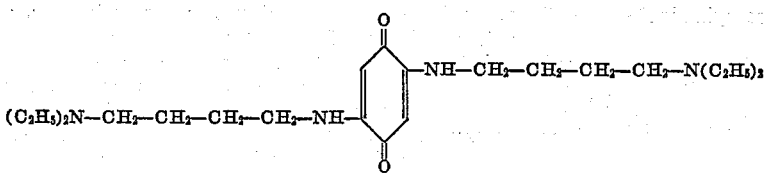

To 8.3 g. of 2-(4-diethylaminobutylamino)-p-benzoquinone in 100 ml. of dioxane there was added 6.3 g.

Interaction of the amine with two molecular equivalents of p-cyanobenzyl bromide yields 2,5-bis-(4-diethylaminobutylamino)-p-benzoquinone bis - (p-cyanobenzyl bromide),

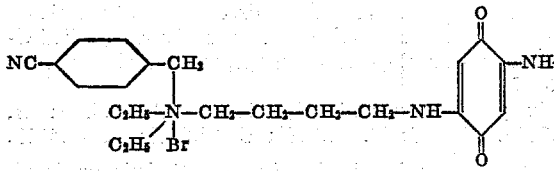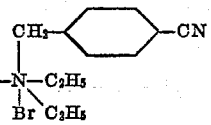

EXAMPLE 21

A. 2,5 - bis - (5 - diethylaminoamylamino) - p - benzoquinone

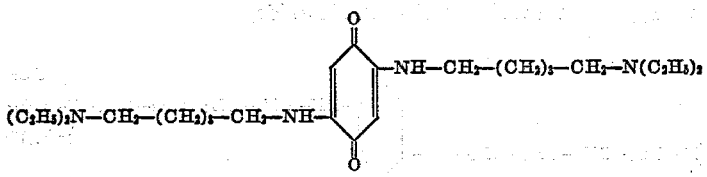

24 g. of N,N-diethyl-1,5-pentanediamine was added with cooling to 15 g. of p-benzoquinone in 150 ml. of dioxane. Oxygen was passed into the slightly warm solution for twenty hours. The reaction mixture was then concentrated under reduced pressure to a thick slush which was filtered. The collected solid was dissolved in ethanol, and water was added to the alcoholic solution, thereby causing the separation of a dark red oil which crystallized on standing. The crystalline solid, which weighed 4.9 g., was 2,5-bis-(5-diethylaminoamylamino)-p-benzoquinone. It melted at 94–98° C.

Analysis.—Calculated: N, 13.32%. Found: N, 12.96%.

B. Quaternary salts of 2,5 - bis - (5 - diethylaminoamylamino)-p-benzoquinone 2 g. of 2,5-bis-(5-diethylaminoamylamino)-p-benzoquinone was quaternized by treatment with methyl bromide in ethanolic solution, and ether was then added to the reaction mixture. The red oil which precipitated solidified on standing to yield 2.5 g. of 2,5-bis-(5-diethylaminoamylamino)-p-benzoquinone bis - methobromide, having the formula

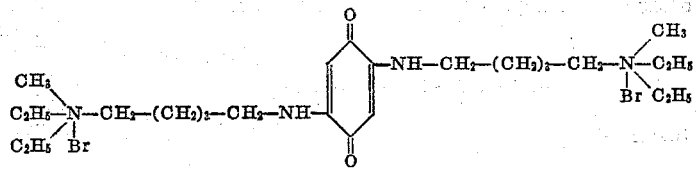

which melted at 112–113° C.

Analysis.—Calculated: N, 9.18%; Br, 26.19%. Found: N, 9.07%; Br, 25.68%.

The amine reacts with two molecular equivalents of methyl p-toluene-sulfonate to yield 2,5-bis-(5-diethylaminoamylamino) - p - benzoquinone bis - (methyl p-toluenesulfonate),

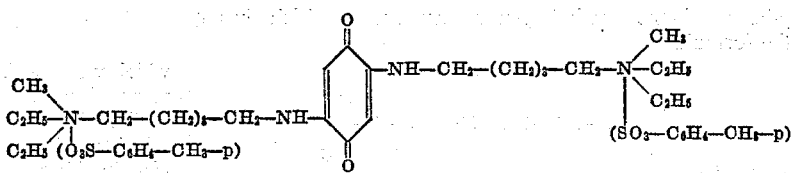

EXAMPLE 22

A. 2,5 - bis - [5 - (1 - piperidyl)amylamino] - p - benzoquinone

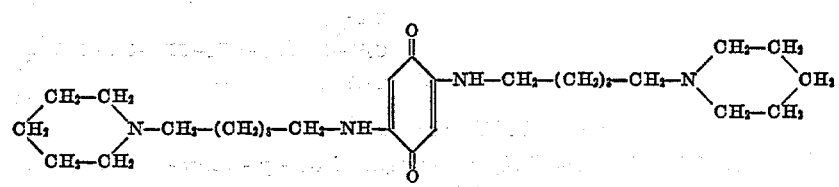

25 g. of 1-(5-aminoamyl)piperidine was added with cooling to a solution of 15 g. (an excess) of p-benzoquinone in 300 ml. of dioxane. The solution was warmed and oxygen was bubbled into the warm solution for twenty hours. The reaction mixture was concentrated under reduced pressure. The concentrated solution was cooled and the red crystalline solid which separated was collected on a filter. This solid was recrystallized from 95% ethanol to yield 9 g. of 2,5-bis-[5-(1-piperidyl)amylamino]-p-benzoquinone.

B. *Quaternary salts of 2,5-bis-[5-(1-piperidyl)amyl-amino]-p-benzoquinone*

2,5-bis-[5-(1-piperidyl)amylamino]-p-benzoquinone reacts with two equivalents of methyl bromide, to yield 2,5-bis-[5-(1-piperidyl)amylamino]-p-benzoquinone bis-methobromide,

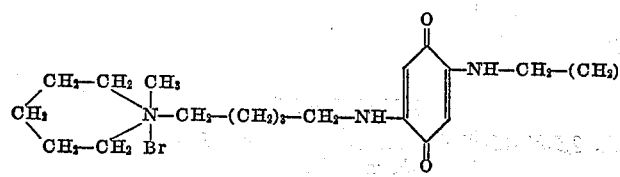

which melted at 264–270° C. (dec.).

*Analysis.*—Calculated: N, 8.83%; Br. 25.19%. Found: N, 8.90%; Br, 25.25%.

The amine reacts with diethyl sulfate to yield 2,5-bis-[5-(1-piperidyl)amylamino]-p-benzoquinone bis-(ethosulfate),

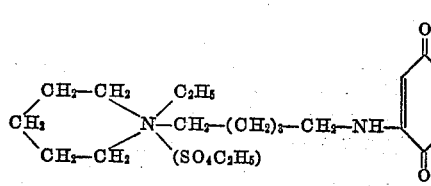

Interaction of the amine with two molecular equivalents of p-methylbenzyl chloride yields 2,5-bis-[5-(1-piperidyl)amylamino]-p-benzoquinone bis-(p-methylbenzyl chloride),

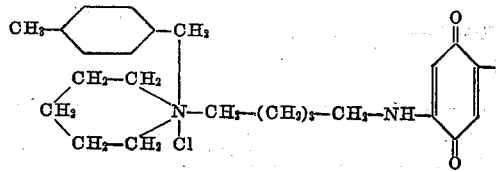

EXAMPLE 23

A. *2-(5-diethylaminoamylamino)-p-benzoquinone*

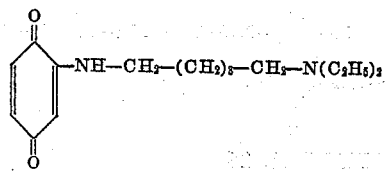

Employing a procedure similar to that described in part A of Example 6, one equivalent of N,N-diethyl-1,5-pentanediamine was reacted with p-benzoquinone under conditions of mild oxidation. There was thus obtained 2-(5-diethylaminoamylamino)-p-benzoquinone, which melted at 84–86° C.

*Analysis.*—Calculated: N, 10.60%. Found: N, 11.19%.

B. *Quaternary salts of 2-(5-diethylaminoamylamino)-p-benzoquinone*

2 - (5 - diethylaminoamylamino) - p - benzoquinone was quaternized by treatment with one equivalent of methyl bromide to yield 2-(5-diethylaminoamylamino)-p-benzoquinone methobromide,

which had an indefinite melting point, ca. 113° C.

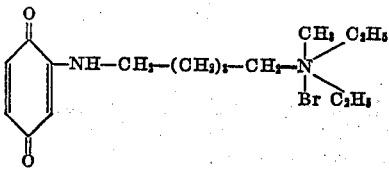

*Analysis.*—Calculated: N, 7.79%; Br, 22.22%. Found: N, 7.57%; Br, 22.92%.

The amine reacts with one equivalent of benzyl chloride to yield 2-(5-diethylaminoamylamino)-p-benzoquinone benzyl chloride,

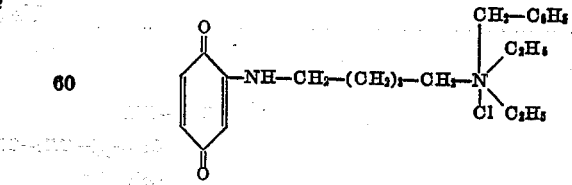

Interaction of the amine with p-trifluoromethylbenzyl bromide yields 2-(5-diethylaminoamylamino)-p-benzoquinone p-trifluoromethylbenzyl chloride,

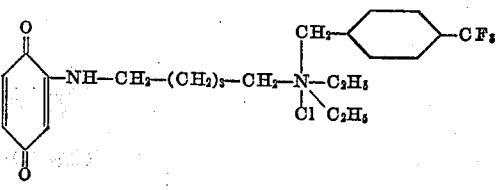

EXAMPLE 24

A. *2-[5-(1-piperidyl)amylamino]-p-benzoquinone*

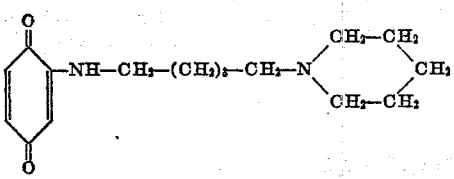

Using a procedure similar to that described in Part A of Example 8, p-benzoquinone was reacted with one equivalent of 1-(5-aminoamyl)piperidine. After concentrating the reaction mixture, there was obtained as a product 2-[5-(1-piperidyl)amylamino]-p-benzoquinone, which melted at 176–177° C.

*Analysis.*—Calculated: N, 10.14%; C, 69.53%; H, 8.75%. Found: N, 9.98%; C, 69.63%; H, 8.97%.

This amine reacts with hydrobromic acid to yield the amine hydrobromide.

B. *Quaternary salts of 2-[5-(1-piperidyl)amylamino]-p-benzoquinone*

When 2-[5-(1-piperidyl)amylamino]-p-benzoquinone was quaternized by treatment with one equivalent of methyl bromide, there was obtained 2-[5-(1-piperidyl)-amylamino]-p-benzoquinone methobromide,

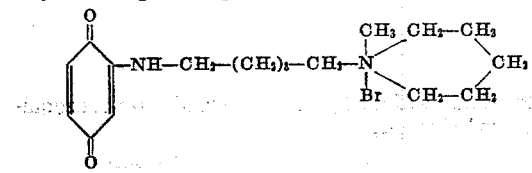

The amine reacts with allyl bromide to yield 2-[5-(1-piperidyl)amylamino]-p-benzoquinone allyl bromide

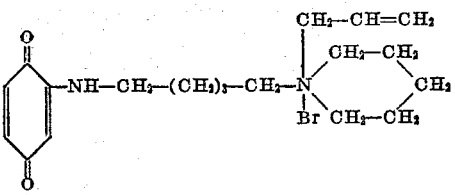

EXAMPLE 25

A. *2,5-bis-(3-diethylaminopropylamino)-3,6-dichloro-p-benzoquinone*

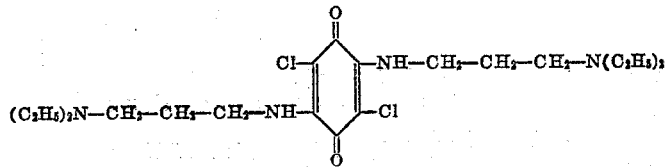

A solution of 7 g. of chloranil and 33 g. (an excess) of N,N-diethyl-1,3-propanediamine in 100 ml. of dioxane was heated on a steam bath for six hours and the reaction mixture was then concentrated under reduced pressure. The crystalline residue thus obtained was recrystallized from hot ethanol to yield 7.2 g. of 2,5-bis-(3-diethylaminopropylamino)-3,6-dichloro-p-benzoquinone, in the form of bronze-colored needles, which melted at 136–137° C.

*Analysis.*—Calculated: N, 12.93%; Cl, 16.36%. Found: N, 12.92%; Cl, 15.92%.

B. *Quaternary salts of 2,5 - bis - (3-diethylaminopropylamino)-3,6-dichloro-p-benzoquinone*

5 g. of 2,5 - bis - (3 - diethylaminopropylamino)-3,6-dichloro-p-benzoquinone was quaternized by heating with 11 g. of benzyl chloride in 95% ethanol for six hours. There was thus obtained 5.5 g. of 2,5-bis-(3-diethylaminopropylamino) - 3,6 - dichloro-p-benzoquinone bis-(benzyl chloride),

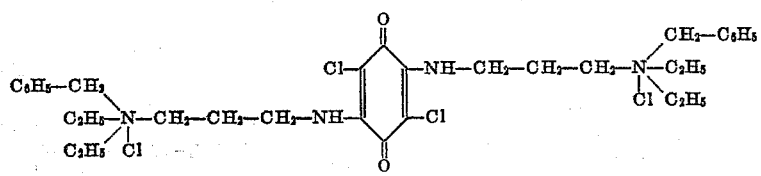

which was a dark brown powder with an indefinite melting point.

*Analysis.*—Calculated: N, 8.17%; Cl, 20.65%. Found: N, 8.22%; Cl, 20.60%.

In analogous fashion, the amine reacts with two molecular equivalents of benzyl bromide to yield 2,5-bis-(3-diethylaminopropylamino) - 3,6-dichloro-p-benzoquinone bis-(benzyl bromide),

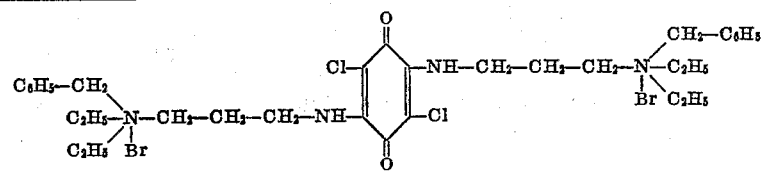

EXAMPLE 26

A. *2,5 - bis - [3 - (1 - piperidyl)propylamino] - 3,6 - dibromo-p-benzoquinone and quaternary salts thereof*

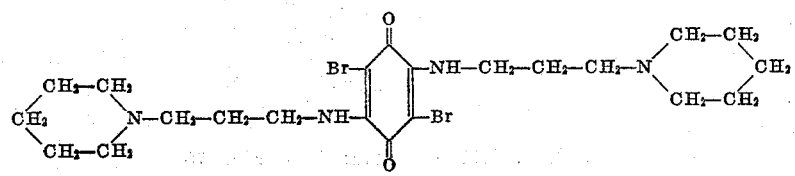

When bromanil is heated with slightly more than two molecular equivalents of 1-(3-aminopropyl)piperidine in dioxane solution, there is produced 2,5-bis-[3-(1-piperidyl)propylamino] - 3,6 - dibromo-p-benzoquinone, which reacts with allyl chloride to form a bis-(allyl chloride) having the formula

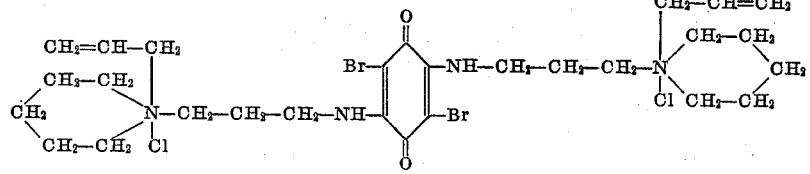

and with methyl bromide to form a bis-(methobromide) having the formula

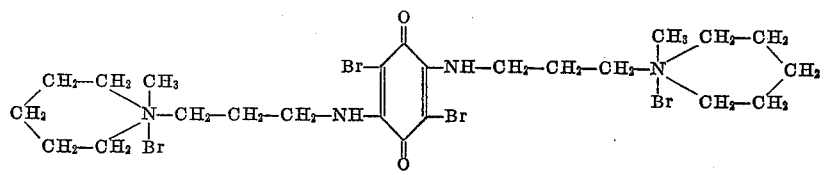

EXAMPLE 27

A. *2,5-bis-[2-(1-piperidyl)ethylamino]-p-benzoquinone*

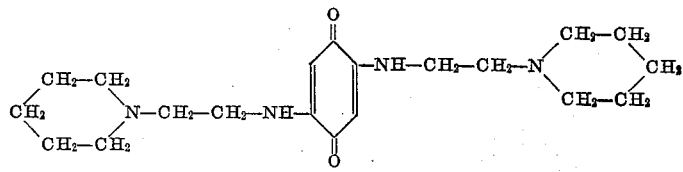

This product, which melted at 158–160° C., was prepared by interacting two molecular equivalents of 1-(2-aminoethyl)piperidine with p-benzoquinone in the presence of oxygen. The compound had no useful curarimimetic activity; its $ED_{50}$ in mice was greater than 200 mg./kg.

B. *2,5-bis-[2-(1-piperidyl)ethylamino]-p-benzoquinone bis-methobromide*

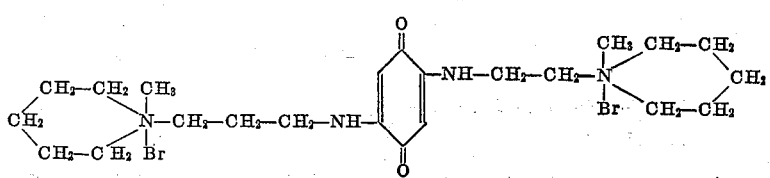

This compound was prepared by interacting the bis-tertiary amine described in Part A above with two molecular equivalents of methyl bromide. It melted at 270–271° C. (dec.). It was hygroscopic. In contrast with the bis-tertiary amine, this quaternary ammonium compound had high curarimimetic activity; its $ED_{50}$ in mice was 1.5 mg./kg.

Certain of the mono- and bis-(tertiary amino)alkylamino-p-benzoquinones employed as intermediates in the preparation of the above-described quaternary ammonium compounds, as well as the preparation of these intermediates, are described and claimed in U. S. Patent 2,701,247, issued February 1, 1955, which is a division of my copending application Serial No. 119,760, filed October 5, 1949, now abandoned.

I claim:
1. A compound selected from the group of quaternary ammonium compounds having the formulas

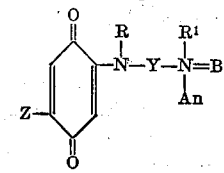

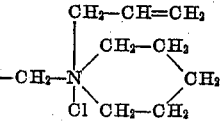

and

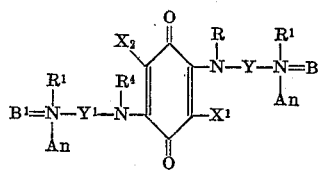

where Z is a member of the class consisting of hydrogen, lower alkylamino radicals, and di-(lower alkyl)amino radicals; R and $R^4$ are members of the class consisting of hydrogen and methyl; $R^1$ is a member of the class consisting of lower alkyl radicals, lower alkenyl radicals, and (monocyclic aryl)methyl radicals containing 7–10 carbon atoms selected from the group consisting of the benzyl, lower alkoxybenzyl, halobenzyl, lower alkylbenzyl, nitrobenzyl, lower alkylmercaptobenzyl, lower alkanoylaminobenzyl, lower alkylsulfonylbenzyl, cyanobenzyl, and (trifluoromethyl)benzyl radicals; Y and $Y^1$ are each a lower alkylene bridge interposing 2–5 carbon atoms between the two nitrogen atoms connected by the bridge; N=B and N=$B^1$ are members of the class consisting of 1-piperidyl, 4-morpholinyl, 4-thiamorpholinyl, 1-pyrrolidyl, and di-(lower alkyl)amino radicals; $X^1$ and $X^2$ are identical members of the class consisting of hydrogen, chlorine, and bromine; and An is a non-toxic anion.

2. A quaternary ammonium compound having the formula

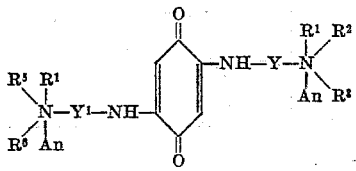

where $R^1$ is the benzyl radical; $R^2$, $R^3$, $R^5$, and $R^6$ are lower alkyl radicals; Y and $Y^1$ are each a lower alkylene bridge interposing 2–5 carbon atoms between the two nitrogen atoms connected by the bridge; and An is a non-toxic anion.

3. A quaternary ammonium compound having the formula

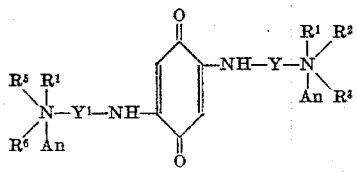

where $R^1$, $R^2$, $R^3$, $R^5$, and $R^6$ are lower alkyl radicals; Y and $Y^1$ are each a lower alkylene bridge interposing 2–5 carbon atoms between the two nitrogen atoms connected by the bridge; and An is a non-toxic anion.

4. A quaternary ammonium compound having the formula

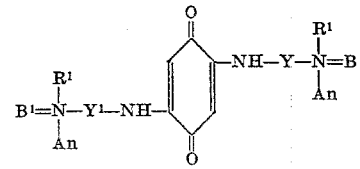

where $R^1$ is the benzyl radical; N=B and N=$B^1$ are 1-piperidyl radicals; Y and $Y^1$ are each a lower alkylene bridge interposing 2–5 carbon atoms between the two nitrogen atoms connected by the bridge; and An is a non-toxic anion.

5. A quaternary ammonium compound having the formula

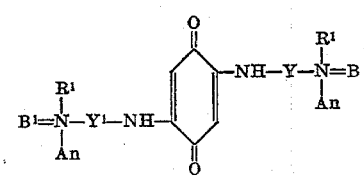

where $R^1$ is a lower alkyl radical; N=B and N=$B^1$ are 1-piperidyl radicals; Y and $Y^1$ are each a lower alkylene bridge interposing 2–5 carbon atoms between the two nitrogen atoms connected by the bridge; and An is a non-toxic anion.

6. A quaternary ammonium compound having the formula

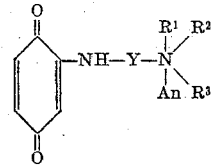

where $R^1$, $R^2$, and $R^3$ are lower alkyl radicals; Y is a lower alkylene bridge interposing 2–5 carbon atoms between the two nitrogen atoms connected by the bridge; and An is a non-toxic anion.

7. A quaternary ammonium compound having the formula

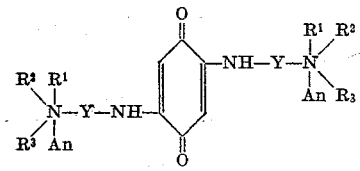

where $R^1$ is the benzyl radical; $R^2$ and $R^3$ are lower alkyl radicals; Y is a lower alkylene bridge interposing 2–5 carbon atoms between the two nitrogen atoms connected by the bridge; and An is a non-toxic anion.

8. A quaternary ammonium compound having the formula

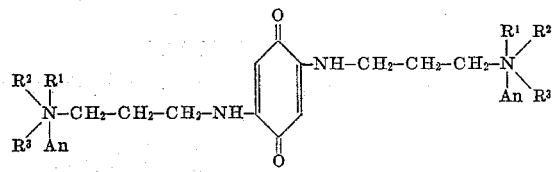

where $R^1$ is the benzyl radical; $R^2$ and $R^3$ are lower alkyl radicals; and An is a non-toxic anion.

9. 2,5-bis-(3-diethylaminopropylamino) - p - benzoquinone bis-(benzyl chloride), having the structural formula

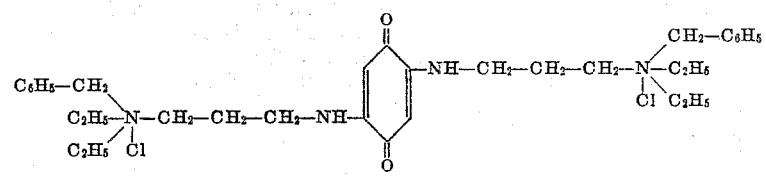

10. 2,5-bis-(3-dimethylaminopropylamino) - p - benzoquinone bis-(benzyl chloride), having the formula

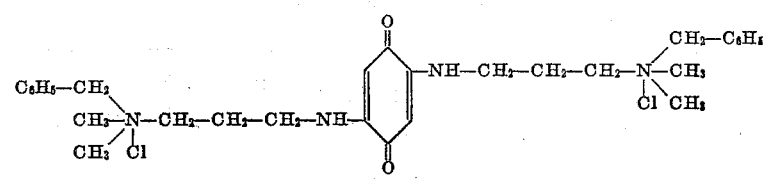

11. A quaternary ammonium compound having the formula

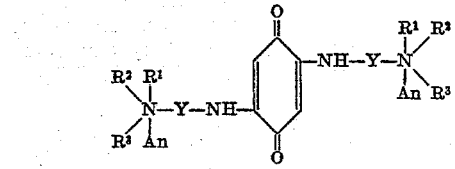

where $R^1$, $R^2$, and $R^3$ are lower alkyl radicals; Y is a lower alkylene bridge interposing 2–5 carbon atoms between the two nitrogen atoms connected by the bridge; and An is a non-toxic anion.

12. A quaternary ammonium compound having the formula

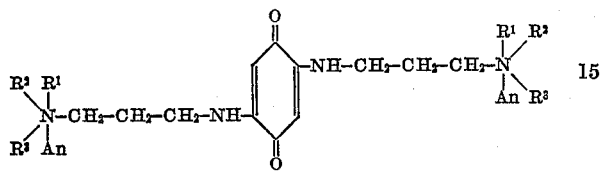

where $R^1$, $R^2$, and $R^3$ are lower alkyl radicals; and An is a non-toxic anion.

13. 2,5-bis-(3-diethylaminopropylamino) - p - benzoquinone bis-methobromide, having the structural formula

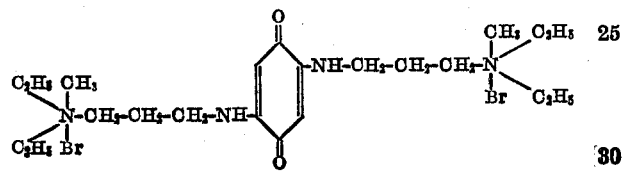

14. 2,5-bis-[3-(1-piperidyl)propylamino] - p - benzoquinone bis-methobromide, having the formula

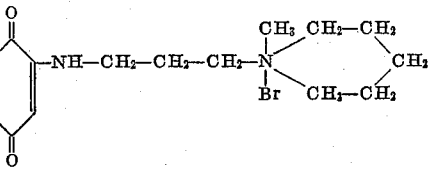

15. 2-(5-diethylaminoamylamino) - p - benzoquinone methobromide, having the formula

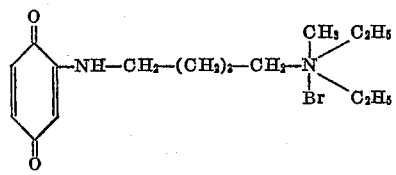

No references cited.

UNITED STATES PATENT OFFICE
CERTIFICATE OF CORRECTION

Patent No. 2,844,585                                          July 22, 1958

Chester J. Cavallito

It is hereby certified that error appears in the printed specification of the above numbered patent requiring correction and that the said Letters Patent should read as corrected below.

Column 1, line 59, after "radicals" strike out "and"; column 2, line 53, before "atoms" insert -- carbon --; line 54, for "$R^6$ and $R^6$" read -- $R^5$ and $R^6$ --; line 56, strike out "oxygen", second occurrence; column 3, line 42, for "1.3" read -- 1,3 --; column 24, after line 40, insert the title -- EXAMPLE 11 --.

Signed and sealed this 23rd day of December 1958.

(SEAL)

Attest:

KARL H. AXLINE                                                        ROBERT C. WATSON  
Attesting Officer                                                   Commissioner of Patents